United States Patent
Kawanishi et al.

(10) Patent No.: US 7,853,153 B2
(45) Date of Patent: Dec. 14, 2010

(54) FOURTH HARMONIC GENERATING SYSTEM USING OPTICAL DOUBLE SIDE-BAND SUPPRESSED CARRIER MODULATOR

(75) Inventors: Tetsuya Kawanishi, Tokyo (JP); Masayuki Izutsu, Tokyo (JP); Takahide Sakamoto, Tokyo (JP); Masahiro Tsuchiya, Tokyo (JP)

(73) Assignee: National Institute of Information and Communications Technology, Koganei-Shi, Tokyo (JP)

( * ) Notice: Subject to any disclaimer, the term of this patent is extended or adjusted under 35 U.S.C. 154(b) by 548 days.

(21) Appl. No.: 12/063,231

(22) PCT Filed: Aug. 8, 2006

(86) PCT No.: PCT/JP2006/315657
§ 371 (c)(1),
(2), (4) Date: Feb. 7, 2008

(87) PCT Pub. No.: WO2007/018209
PCT Pub. Date: Feb. 15, 2007

(65) Prior Publication Data
US 2009/0103924 A1   Apr. 23, 2009

(30) Foreign Application Priority Data
Aug. 8, 2005  (JP) .............................. 2005-229115

(51) Int. Cl.
*H04B 10/04* (2006.01)
*H04B 10/00* (2006.01)
(52) U.S. Cl. .................... 398/183; 398/115; 398/182; 398/184; 398/187; 398/188; 359/278; 359/279
(58) Field of Classification Search ................ 398/115, 398/182–191; 359/278, 279
See application file for complete search history.

(56) References Cited

U.S. PATENT DOCUMENTS
6,219,469 B1  4/2001  Minakata et al.
(Continued)

FOREIGN PATENT DOCUMENTS
JP  2000-47159 A  2/2000
(Continued)

OTHER PUBLICATIONS

Abstract, T.Kawanishi, M. Izutsu "Optical frequency shifter with SSB modulator",Technical Report of IEICE, OCS2002-49,PS2002-33,OFT2002-30(Aug. 2002).
(Continued)

*Primary Examiner*—Kenneth N Vanderpuye
*Assistant Examiner*—Daniel G Dobson
(74) *Attorney, Agent, or Firm*—Ostrager Chong Flaherty & Broitman P.C.

(57) ABSTRACT

The present invention is to provide an optical modulating system for generating a signal of a frequency $(f_0+2f_m)$ and a signal of a frequency $(f_0-2f_m)$ and suppressing a signal of a frequency $(f_0)$ by a DSB-SC modulator.

A fourth harmonic generating system for solving the above problem comprises a first DSB-SC modulator (2) a second DSB-SC modulator (3) and a signal control section (5) for controlling a modulating signal from a signal source (4) for generating modulating signals applied to the first and second DSB-SC modulators (2,3) so that a lower side-band signal $(f_0)$ generated by modulating the upper side-band signal of the DSB-SC modulator (2) by the DSB-SC modulator (3) and an upper side-band signal $(f_0)$ generated by modulating the lower side-band signal of the DSB-SC modulator (2) by the DSB-SC modulator (3) cancel each other.

7 Claims, 10 Drawing Sheets

U.S. PATENT DOCUMENTS

| | | |
|---|---|---|
| 7,120,359 B2 * | 10/2006 | Way .............................. 398/59 |
| 2001/0008569 A1 | 7/2001 | Rangary |
| 2002/0048076 A1 | 4/2002 | Kondo et al. |
| 2002/0126932 A1 | 9/2002 | Minakata et al. |
| 2002/0154378 A1 | 10/2002 | Kawanishi et al. |
| 2005/0175357 A1 | 8/2005 | Kawanishi et al. |
| 2007/0019968 A1 | 1/2007 | Hashimoto et al. |

FOREIGN PATENT DOCUMENTS

| | | |
|---|---|---|
| JP | 2000-122015 A | 4/2000 |
| JP | 2000-267056 A | 9/2000 |
| JP | 2001-147408 A | 5/2001 |
| JP | 2001-264714 A | 9/2001 |
| JP | 2002-341299 A | 11/2002 |
| JP | 2004-252386 A | 9/2004 |
| JP | 2004-302238 A | 10/2004 |
| JP | 2005-215196 A | 8/2005 |
| JP | 2005-244655 A | 9/2005 |

OTHER PUBLICATIONS

Abstract, T. Kawanishi, S. Oikawa, M. Izutsu, "Resonant-type Optical Modulator with Planar Structure", Technical Report of IEICE, LQE2001-3 (May 2001).

International Preliminary Report on Patentability.

* cited by examiner

Fig. 9
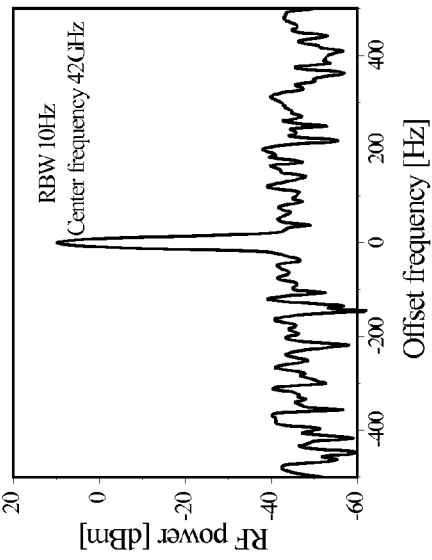
Fig. 9 (A)
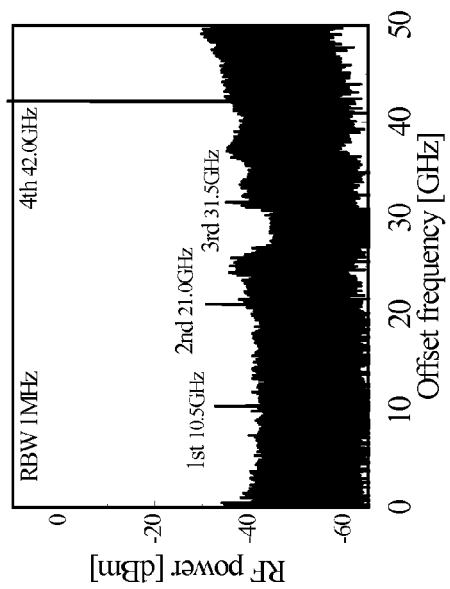
Fig. 9 (C)
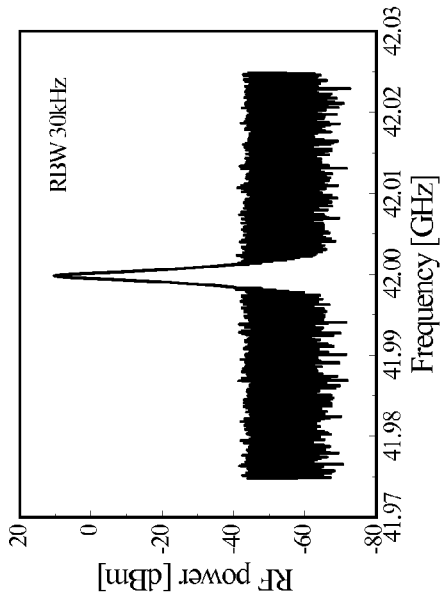
Fig. 9 (B)
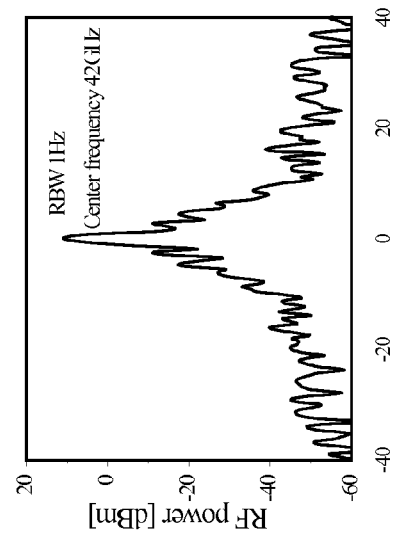
Fig. 9 (D)

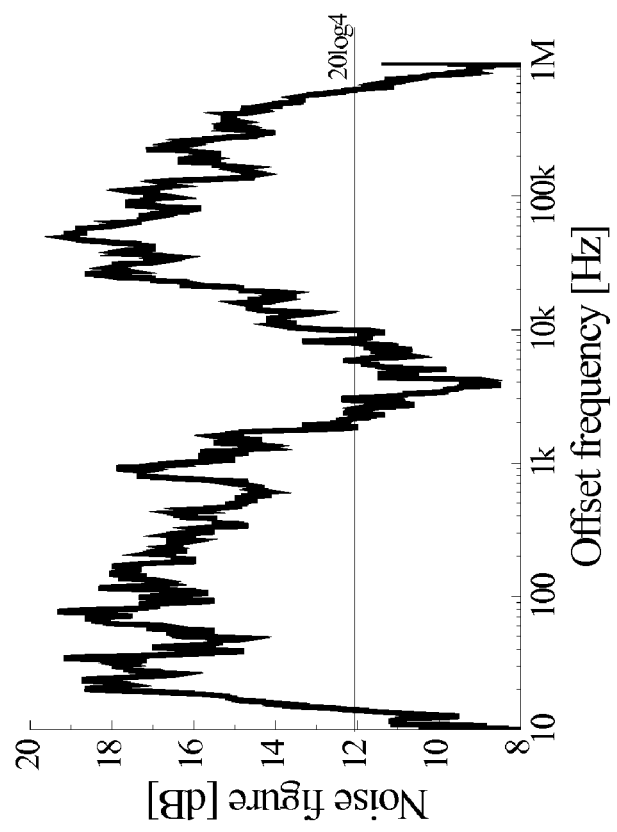
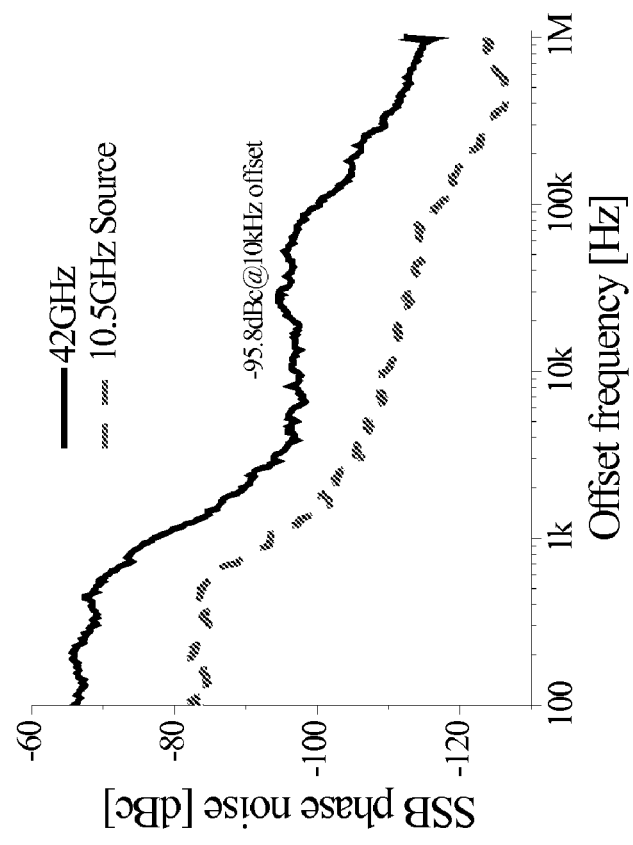
Fig. 10
Fig. 10 (A)
Fig. 10 (B)

Fig. 17
Fig. 17(A)
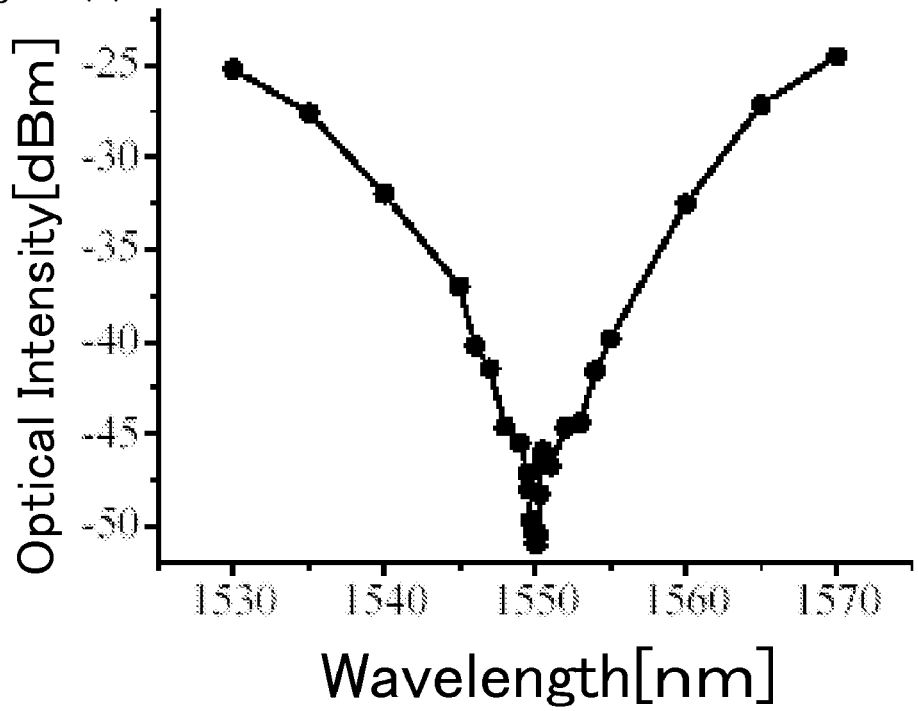
Fig. 17(B)
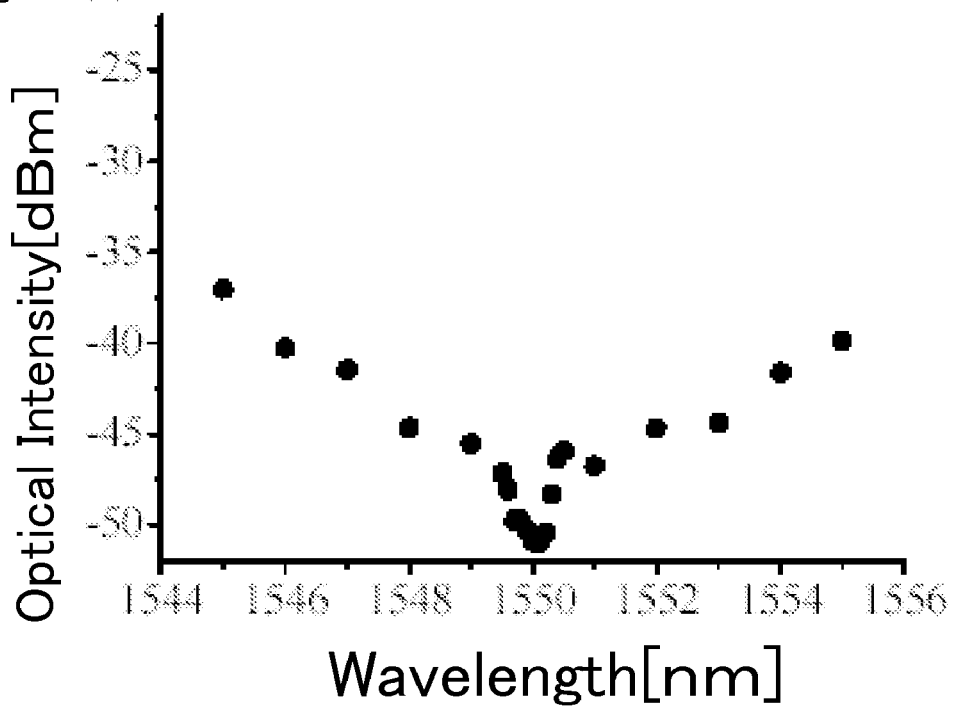

FOURTH HARMONIC GENERATING SYSTEM USING OPTICAL DOUBLE SIDE-BAND SUPPRESSED CARRIER MODULATOR

CROSS REFERENCE TO RELATED APPLICATION

The present disclosure relates to subject matter contained in the international patent application No. PCT/JP2006/315657 filed on Aug. 8, 2006, and Japanese Patent Application No. 2005-229115 filed on Aug. 8, 2005, the disclosure of which is expressly incorporated herein by reference in its entirety.

BACKGROUND OF THE INVENTION

1. Field of the Invention

The present invention relates to a fourth harmonic generating system using an optical double side-band suppressed carrier modulator and the like.

2. Description of the Related Art

As an optical modulator, an optical double side-band suppressed carrier modulator (DSB-SC modulator) is known. Specifically, FIG. 37 of Japanese Patent Application Laid-Open No. 2004-252386, for example, discloses a DSB-SC modulator having a Mach-Zehnder (referred to below as MZ) which has phase modulators on its both arms and a fixed phase shifter on one of its arms. A DSB-SC modulator, ideally, outputs two side-band (double side-band) signals, suppressing carrier signal components. In other words, USB ($f_0+f_m$) and LSB ($f_0-f_m$) can be obtained by suppressing carrier ($f_0$) by means of the DSB-SC modulator.

Accordingly, it can be assumed that a signal of a frequency ($f_0+2f_m$) and a signal of a frequency ($f_0-2f_m$) can be obtained by shifting a frequency of the DSB-SC modulator from ($f_m$) to ($2f_m$). However, since a frequency of a modulating signal is constrained by a modulation signal source of a system, frequency difference between an USB signal and an LSB signal is limited.

It is conceivable that two DSB-SC modulators are connected in tandem (connected in series) in order to generate a signal of a frequency ($f_0+2f_m$) and a signal of a frequency ($f_0-2f_m$) by the DSB-SC modulator. However, if an output signal, which is modulated by the first DSB-SC modulator, is further modulated by the second DSB-SC modulator, the side-band frequencies of these signals are equal at carrier frequency ($f_0$). Therefore, in a system in which two DSB-SC modulators are connected in tandem, signals of frequencies ($f_0+2f_m$), ($f_0$), and ($f_0-2f_m$) exist. This means that the signal of frequency ($f_0$) remains with some signal strength.

The present invention is made to provide an optical modulating system for generating a signal of a frequency ($f_0+2f_m$) and a signal of a frequency ($f_0-2f_m$) by suppressing a signal of a frequency ($f_0$) by means of a DSB-SC modulator.

The present invention is made to provide an optical modulating system for generating signals whose frequencies ($f_0\pm2f_m$) are separated by four times a modulating frequency ($f_m$) by means of a DSB-SC modulator.

The present invention is made to provide a method for generating an optical signal of a frequency ($f_0+2f_m$) and an optical signal of a frequency ($f_0-2f_m$) by suppressing an optical signal of a frequency ($f_0$) as much as possible by means of a DSB-SC modulator.

SUMMARY OF THE INVENTION

The present invention is based on the following idea. By connecting two DSB-SC modulators in tandem, and by providing a 90 degree phase shift to a modulating signal inputted to those modulators, for example, signals of a frequency ($f_0$) are offset from each other, and two signals of frequencies ($f_0+2f_m$) and ($f_0-2f_m$) can be generated.

The present invention is also based on the idea that by using a radio signal generator adopting the above-mentioned system, radio signals of frequencies ($f_0+2f_m$) and ($f_0-2f_m$) or a frequency ($4f_m$) can be easily generated.

The present invention enables to provide an optical modulating system for generating a signal of a frequency ($f_0+2f_m$) and a signal of a frequency ($f_0-2f_m$) by suppressing a signal of a frequency ($f_0$) by means of a DSB-SC modulator.

The present invention enables to provide an optical modulating system for generating signals whose frequencies ($f_0\pm2f_m$) are separated by four times a modulating frequency ($f_m$) by means of a DSB-SC modulator.

The present invention enables to provide two carrier suppressed signals ($f_0\pm2f_m$) effectively by means of carrier suppressed DSB-SC modulation.

BRIEF DESCRIPTION OF THE DRAWINGS

FIG. 9 (A) to FIG. 9 (D) are spectra charts of radio frequency signals generated in the present embodiment. FIG. 9 (A) shows a spectrum with a resolution bandwidth (RBW) of 30 kHz. The vertical axis represents signal strength [dBm] and the horizontal axis represents frequency [GHz]. FIG. 9 (B) shows a spectrum with an RBW of 1 Hz and a center frequency of 42 GHz. The vertical axis represents signal strength [dBm] and the horizontal axis represents frequency [GHz]. FIG. 9 (C) shows a spectrum with an RBW of 10 Hz and a center frequency of 42 GHz. The vertical axis represents signal strength [dBm] and the horizontal axis represents frequency [GHz]. FIG. 9 (D) shows a spectrum with an RBW of 1 MHz. The vertical axis represents signal strength [dBm] and the horizontal axis represents frequency [GHz].

FIG. 10 (A) and FIG. 10 (B) are graphs showing SSB (Single Side-Band) phase noise. FIG. 10(A) is a graph showing a phase noise. FIG. 10(B) is a graph showing a noise figure that is a ratio of phase noise to source.

FIG. 17 is a graph showing a relationship between wavelength and output light when a wavelength of an output light from an optical source is 1550 nm, and bias voltage is adjusted so that an output from a main MZ is minimized.

THE BEST MODE FOR CARRYING OUT THE INVENTION

1. Forth Harmonic Generating System

Figure 1:
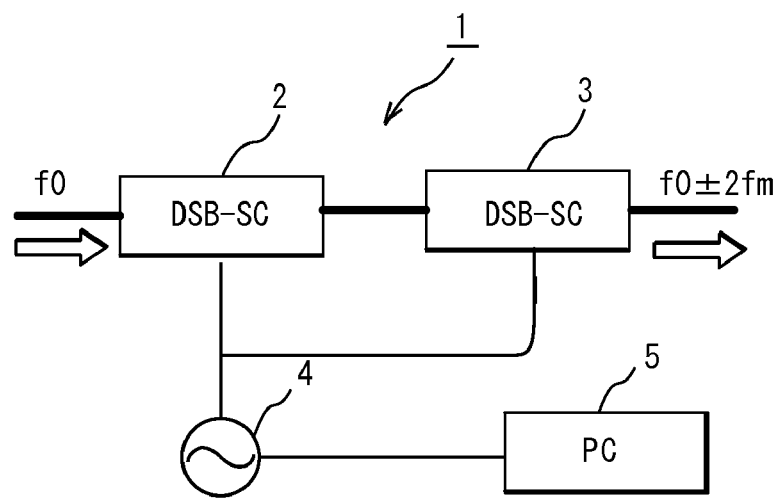
FIG. 1 is a block diagram showing a basic arrangement of a fourth harmonic generating system according to the first aspect of the present invention.

FIG. 1 is a block diagram showing a basic arrangement of a fourth harmonic generating system according to the first aspect of the present invention. As shown in FIG. 1, the forth harmonic generating system using optical double side-band suppressed carrier modulators, the system comprising: a first optical double side-band suppressed carrier modulator (2); a second optical double side-band suppressed carrier modulator (3), the second optical double side-band suppressed carrier modulator (3) being connected in series to the first optical double side-band suppressed carrier modulator (2); a signal source (4) for generating a modulating signal, the modulating signal being applied to the first optical double side-band suppressed carrier modulator (2) and the second optical double side-band suppressed carrier modulator (3); and a signal controller (5) for controlling a modulating signal, the modulating signal being applied to the first optical double side-band suppressed carrier modulator (2) and the second optical double side-band suppressed carrier modulator (3) by the signal source (4), wherein "a lower side-band signal of the second optical double side-band suppressed carrier modulator (3) which is a modulated signal of an upper side-band signal of the first optical double side-band suppressed carrier modulator (2)" and "an upper side-band signal of the second optical double side-band suppressed carrier modulator (3) which is a modulated signal of a lower side-band signal of the first optical double side-band suppressed carrier modulator (2)" are canceled each other, thereby a forth harmonic signal is obtained. Each modulator may be connected with a known waveguide such as an optical fiber.

It is to be noted that, since the frequencies ($f_0 \pm 2f_m$) of two signals generated by this system are separated by four times a modulating frequency ($f_m$), these signals are called fourth harmonic waves. In other words, "the forth harmonic generating system" is a system to generate signals with frequency ($f_0 \pm 2f_m$, etc.) separated by four times a modulating frequency ($f_m$).

The signal controller (5) may control to produce a phase difference of 180° between a lower side-band signal generated by modulating the upper side-band signal of the first optical double side-band suppressed carrier modulator (2) by means of the second optical double side-band suppressed carrier modulator (3) and an upper side-band signal generated by modulating the lower side-band signal of the first optical double side-band suppressed carrier modulator (2) by means of the second optical double side-band suppressed carrier modulator (3).

Also, the signal controller (5) may control to produce a phase difference of 90° between modulating signals which is applied by the signal source (4) to the first optical double side-band suppressed carrier modulator (2) and the second optical double side-band suppressed carrier modulator (3).

Through this process, a phase difference of 180° between a lower side-band signal generated by modulating the upper side-band signal of the first optical DSB-SC modulator (2) by means of the second optical DSB-SC modulator (3) and an upper side-band signal generated by modulating the lower side-band signal of the first optical DSB-SC modulator (2) by means of the second optical DSB-SC modulator (3) is attained.

And, these two signals, by canceling each other, are ideally obliterated. Accordingly, the component of frequency ($f_0$) is suppressed and two signals ($f_0 \pm 2f_m$) can be generated.

The signal controller (5) controls a difference between a delay of an optical signal inputted to the first optical double side-band suppressed carrier modulator (2) and the second optical double side-band suppressed carrier modulator (3) (time difference between the modulation time of the first modulator (2) and that of the second modulator (3)) and a delay of a modulating signal applied to the two modulators (2, 3), so that the difference is represented by the following equation:

$$(2n+1)/4f_m [\text{second}]$$

Where n is integer, and $f_m$ [Hz] is frequency of a modulating signal applied to the two modulators (2, 3). This enables to control a signal by two modulators. Note that n is preferably 0 or 1. Such a delay may be adjusted by a variable delay device for providing an optional time difference to a modulating signal of the two optical modulators. The delay may also be adjusted by a signal controller functioning as a variable delay device.

1.2. DSB-SC Modulator

As a DSB-SC modulator, a known DSB-SC modulator can be used as needed. FIG. 37 of Japanese Patent Application Laid-Open No. 2004-252386, for example, discloses a Mach-Zehnder waveguide (MZ) formed on an LN waveguide, phase modulators provided on the both arms of the MZ, and a fixed phase shifter provided on one of the arms of the MZ. A conventional optical SSB (single side-band) modulator or a conventional optical FSK (frequency shift keying) modulator may be used as a DSB-SC modulator. It is preferable to use a signal generated from the same signal source as a modulating signal applied to the two DSB-SC modulators.

An optical FSK modulator, for example, is provided with a first sub Mach-Zehnder waveguide ($MZ_A$), a second sub Mach-Zehnder waveguide ($MZ_B$), and a main Mach-Zehnder waveguide ($MZ_C$). The $MZ_C$, containing the $MZ_A$ and $MZ_B$, is provided with an input portion of light and an output portion for outputting a modulated light.

The optical FSK modulator is also provided with a first direct-current or low-frequency electrode ($DC_A$ electrode), a second direct-current or low-frequency electrode ($DC_B$ electrode), a first RF electrode ($RF_A$ electrode), a second RF electrode ($RF_B$ electrode), and an electrode ($RF_C$ electrode).

The $DC_A$ electrode is an electrode for controlling a phase of light transmitted through two arms of the $MZ_A$ by controlling bias voltage therebetween.

The $DC_B$ electrode is an electrode for controlling a phase of a light transmitted through two arms of the $MZ_B$ by controlling bias voltage therebetween.

The $RF_A$ electrode is an electrode for inputting radio frequency (RF) signals to the two arms composing the $MZ_A$.

The $RF_B$ electrode is an electrode for inputting radio frequency (RF) signals to the two arms composing the $MZ_B$.

The $RF_C$ electrode is an electrode for controlling a frequency of light outputted from the output portion by controlling voltage or phase of RF signal inputted.

Each Mach-Zehnder waveguide, for example, is provided with a waveguide of nearly hexagonal shape (which composes two arms of the MZ), and is provided with two parallel-aligned phase modulators.

A Mach-Zehuder waveguide or an electrode is generally provided on a substrate. The material of a substrate and each waveguide is not specifically limited if light can propagate therethrough. For example, a lithium niobate waveguide with a Ti diffusion may be formed on an LN substrate, and a silicon dioxide ($SiO_2$) waveguide may be formed on a silicon (Si) substrate. Also, an optical semiconductor waveguide such as an InGaAsP waveguide (a GaAlAs waveguide) formed on an indium phosphide substrate (a GaAs substrate) may be used. The substrate is preferably formed of lithium niobate ($LiNbO_3$: LN) and cut out in a direction orthogonal to the X-axis (X-cut), and light is propagated in a Z-axis direction (Z-axis propagation). This is because a low-power-consumption drive and a superior response speed can be achieved due to dynamic electrooptic effect. An optical waveguide is formed in the surface portion of a substrate having an X-cut plane (YZ plane), and guided light propagates along the Z-axis (the optic axis). A lithium niobate substrate except the X-cut may be used. As a substrate, it is possible to use a material of a one-axis crystal having a crystal system such as a trigonal system and a hexagonal system and having electro optical effect or a material in which a point group of a crystal is $C_{3V}$, $C_3$, $D_3$, $C_{3h}$, and $D_{3h}$. These materials have a refractive index adjusting function in which a change in the refractive index due to the application of an electric field has a different sign depending on a mode of a propagation light. As a specific example, lithium tantalite oxide ($LiTO_3$:LT), $\beta$-$BaB_2O_4$ (abbr. BBO), $LiTO_3$ and the like can be used other than lithium niobate.

The dimension of a substrate is not particularly limited if it is large enough to be able to form a predefined waveguide. The width, length, and the depth of each waveguide is also not particularly limited if the module of the present invention is able to fulfill its function. The width of each waveguide can be, for example, around 1 μm to 20 μm, preferably about 5 μm to 10 μm. The depth (the thickness) of waveguide can be 10 nm to 1 μm, preferably 50 nm to 200 nm.

The first bias adjustment electrode ($DC_A$ electrode) is an electrode for controlling bias voltage between the two arms (path 1 and Path 3) composing the $MZ_A$ to control a phase of light propagating between the two arms of the $MZ_A$. On the other hand, the second bias adjustment electrode ($DC_B$ electrode) is an electrode for controlling bias voltage between the two arms (path 2 and path 4) composing the $MZ_B$ to control a phase of light propagating between the two arms of the $MZ_B$.

The $DC_A$ electrode and the $DC_B$ electrode are preferably direct current electrodes or low frequency electrodes in general. It is to be noted that "low frequency" of the low frequency electrode means frequency of, for example, 0 Hz to 500 MHz. A phase modulator is preferably provided at the output of this signal source in order to be able to control a phase of an output signal.

The first modulating electrode ($RF_A$ electrode) (27) is an electrode for inputting a radio frequency (RF) signal to the two arms comprising the $MZ_A$. On the other hand, the second modulating electrode ($RF_B$ electrode) (28) is an electrode for inputting a radio frequency (RF) signal to the two arms comprising the $MZ_B$. A traveling-wave-type electrode or a resonant-type electrode can be mentioned as the $RF_A$ electrode and the $RF_B$ electrode, and a resonant-type electrode is preferable.

The $RF_A$ electrode and the $RF_B$ electrode are preferably connected to a high frequency signal source. The high frequency signal source is a device for controlling a signal transmitted to the $RF_A$ electrode and the $RF_B$ electrode. As the high frequency signal source, a known high frequency signal source can be adopted. As frequencies ($f_m$) of the high frequency signal inputted to the $RF_A$ electrode and the $RF_B$ electrode, e.g. 1 GHz to 100 GHz can be mentioned. As an output of a high frequency signal source, a sinusoidal wave having a fixed frequency can be mentioned. A phase modulator is preferably provided at an output of this high frequency signal source in order to be able to control a phase of an output signal.

The $RF_A$ electrode and the $RF_B$ electrode are composed of e.g. gold, platinum or the like. As the width of the $RF_A$ electrode and the $RF_B$ electrode, 1 μm to 10 μm can be mentioned, and 5 μm can be specifically mentioned. As the length of the $RF_A$ electrode and the $RF_B$ electrode, 0.1 times to 0.9 times the wavelength ($f_m$) of the modulating signal can be mentioned including 0.18 to 0.22 times or 0.67 to 0.70 times. And more preferably, it is shorter than the resonant point of the modulating signal by 20 to 25%. This is because with such a length, the synthesized impedance remains in an appropriate region. As a more specific length of the $RF_A$ electrode and the $RF_B$ electrode, 3250 μm can be mentioned. Hereinafter, a resonant-type electrode and a traveling-wave-type electrode are described.

A resonant-type optical electrode (resonant-type optical modulator) is an electrode for performing a modulation by using resonance of a modulating signal. A known resonant-type electrode such as those described in the Japanese Patent Application Laid-Open 2002-268025, and Tetsuya Kawanishi, Satoshi Oikawa, Masayuki Izutsu, "Planar Structure Resonant-type Optical Modulator", TECHNICAL REPORT OF IEICE, LQE2001-3 (2001-05) can be adopted as a resonant-type electrode.

A traveling-wave-type electrode (traveling-wave-type optical modulator) is an electrode (modulator) for modulating light while guiding waves so that a lightwave and an electric signal are guided in the same direction (e.g. Hiroshi Nishihara, Masamitsu Haruna, Toshiaki Suhara, "Optical Integrated Circuit" (revised and updated edition), Ohmsha, pp. 119-120). A known traveling-wave-type electrode such as those described in Japan Patent Application Laid-Open Nos. 11-295674, 2002-169133, 2002-40381, 2000-267056, 2000-471159, and 10-133159, for example, can be adopted as a traveling-wave-type electrode.

As a preferable traveling-wave-type electrode, a so-called symmetrical-type earth electrode arrangement (one provided with at least a pair of earth electrodes on both sides of a traveling-wave-type signal electrode) is adopted. Thus, by symmetrically arranging the earth electrodes on both sides of the signal electrode, a high frequency wave outputted from the signal electrode is made easy to be applied to the earth electrodes arranged on the left and right side of the signal electrode, thereby suppressing an emission of a high frequency wave to the side of the substrate.

The RF electrode may act as both of the electrodes for the RF signal and the DC signal. Namely, either one of or both of the $RF_A$ electrode and the $RF_B$ electrode are connected to a feeder circuit (bias circuit) for supplying the DC signal and the RF signal mixed. The optical SSB modulator of this embodiment has the RF electrode connected to the feeder circuit (bias circuit), an RF signal (ratio frequency signal) and a DC signal (direct current signal: signal related to bias voltage) can be inputted to the RF electrode.

The third RF electrode ($RF_C$ electrode) (29) is an electrode for controlling a phase of a light transmitted through the $MZ_A$ and the $MZ_B$ by controlling bias voltage of the $MZ_A$ and the $MZ_B$. The third electrode ($RF_C$ electrode) is preferably a traveling-wave-type electrode. This is because the switching speed of $RF_C$ electrode will be the data rate of the optical FSK modulator, high speed frequency switching (between USB and LSB) is achieved by adopting a traveling-wave-type electrode as an $RF_C$ electrode.

Concerning the optical FSK modulator, in order to realize a high speed switching, an electrode corresponding to the $DC_C$ of the optical SSB modulator is substituted with an RF (radio frequency) electrode ($RF_C$ electrode), or a combination of a bias modulation electrode and an RF electrode ($RF_C$ electrode). As for an optical FSK modulator which uses RF electrode only, the one whose RF electrode is connected to a feeder circuit (bias circuit) for supplying the DC signal and the RF signal mixed can be mentioned. As an RF electrode, a traveling-wave-type electrode supporting a high speed switching can preferably be used. An RF electrode is an electrode corresponding to the input/output operation of an RF frequency. As for the FSK modulator, USB and LSB can be switched over to be outputted by switching over phase or amplitude of a signal voltage of the $RF_C$ electrode.

The operation of the optical FSK modulator is the same as that of the optical SSB modulator. The operation of the optical SSB modulator is, for example, described in detail in [Tetsuya Kawanishi, Masayuki Izutsu, "Optical frequency shifter using optical SSB modulator", TECHNICAL REPORT OF IEICE, OCS2002-49, PS2002-33, OFT2002-30 (2002-08)], [Higuma et al., "X-cut lithium niobium optical SSB modulator, Electron Letter, vol. 37, 515-516 (2001)] and the like. That is, a USB signal and an LSB signal having positively shifted by a predetermined frequency can be generated by the optical SSB modulator.

The operation of the optical FSK is explained below. Sinusoidal RF signals different from each other by a phase of 90° are inputted to paralleled four optical modulators. Also, with respect to light, bias voltages of the $DC_A$ electrode, the $DC_B$ electrode, and the $RF_C$ electrode are adjusted so that phase differences of light are respectively 90°. Then, a light whose frequency is shifted by the frequency of the RF signal is outputted. The direction of frequency shifting, namely whether the frequency is increased or decreased, can be selected by adjusting voltage level or a phase of a signal applied to the $RF_C$ electrode. In other words, in each phase shifter of the optical FSK modulator shown in FIG. 2, each electricity and light has a phase difference of 90°. It is noted that if X-cut substrate is used, modulations of RF signals whose signal phases are respectively 0°, 90°, 180°, 270° can be achieved in the four phase modulators by simply providing sinusoidal waves with 90° phase difference to the $RF_A$ electrode and the $RF_B$ electrode which are electrodes for RF signals. [Higuma et al., "X-cut lithium niobium optical SSB modulator, Electron Letter, vol. 37, 515-516 (2001)].

Figure 12:
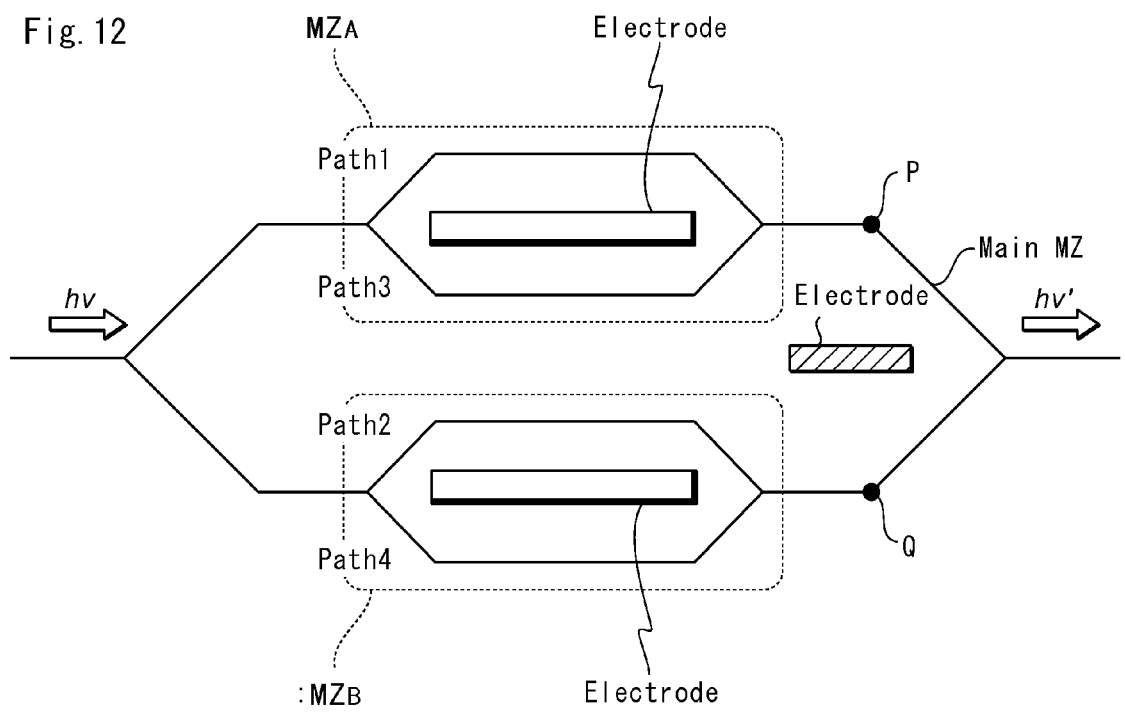
FIG. 12 is a schematic diagram showing an optical FSK modulator (DSB-SC modulator) used in embodiment 2.

For example, in each of MZ structure of FIG. 12, bias voltages of the $DC_A$ electrode and the $DC_B$ electrode are adjusted so that an optical phase difference of two paths (path 1 and path 3, path 2 and path 4) is 180°. And bias voltage of the $RF_C$ electrode is adjusted so that an optical phase difference of the two MZ structures is 90°. The output light contains a USB component only.

On the other hand, only an LSB component is outputted by adjusting bias voltage of the $RF_C$ electrode so that an optical phase difference of the two MZ structures is 270°. Therefore, the USB component and the LSB component can be switched over to be outputted by switching over a signal (or a signal phase applied to two arms) of $RF_C$ electrode. If a traveling-wave-type electrode corresponding to the RF frequency is used as a $RF_C$ electrode, the above-mentioned frequency shifting can be performed at a high speed.

As a forming method of an optical waveguide, a know forming method of a titanium diffusion method and the like or a proton exchange method can be used. In other words, the optical FSK modulator of the present invention, for example, can be manufactured by the following method. Firstly, an optical waveguide is formed by patterning titanium on the surface of a wafer of lithium niobate by photolithography method, and spreading titanium by thermal diffusion method. This is subject to the following conditions. The thickness of titanium is 100 to 2000 angstrom, diffusion temperature is 500 to 2000° C., and diffusion time is 10 to 40 hours. An insulating buffer layer of silicon dioxide (thickness of 0.5 to 2 μm) is formed on a principle surface of the substrate. Secondly, an electrode with metal plating with thickness of 15 to 30 μm is formed on the buffer layer. And lastly, cut off the wafer. By these processes, an optical modulator with titanium-diffused waveguide is manufactured.

Optical FSK modulator, for example, can be manufactured by the following process. A waveguide can be provided on the substrate surface of lithium niobate by proton exchange method or titanium thermal diffusion method. For example, Ti metal stripe (length of few μm) is formed in a row on an LN substrate by photolithographic technique. Subsequently, Ti metal is diffused into the substrate by exposing the LN substrate to heat (about 100° C.). Through this process, a waveguide can be formed on an LN substrate.

Also, an electrode is manufactured in the same way as the above process. For example, in the same way as a formation of an optical waveguide, by using photolithography technique, an electrode can be formed on both sides of a plurality of waveguides which are formed in the same breadth so that the interelectrode gap is about 1 μm to 50 μm.

In case of manufacturing an electrode using silicon substrate, the manufacturing process, for example, is as follows. A lower-cladding layer which is composed mostly of silicon dioxide ($SiO_2$) is disposed on a silicon (Si) substrate by the flame hydrolysis deposition method, and then a core layer which is composed mostly of silicon dioxide ($SiO_2$) to which germanium dioxide ($GeO_2$) is added as a dopant is deposited. Subsequently, vitrification is performed in an electric furnace. And then, forming an optical waveguide by etching and an upper-cladding layer which is composed mostly of silicon dioxide ($SiO_2$) is disposed. And then, a thin-film heater thermooptic intensity modulator and a thin-film heater thermooptic phase modulator are formed on the upper-cladding layer.

A signal source is a device for outputting a signal to be transmitted to an optical FSK modulator, and a known signal source can be adopted. A signal source (FSK signal source)

controls a signal transmitted to the $RF_C$ electrode of the optical FSK modulator. In an embodiment of the optical FSK communication enabling multivalued modulation, a signal source which can set a plurality of voltage levels to be switched over is used. As a signal to be inputted from the signal source to the $RF_C$ electrode, a signal having a frequency component of preferably between 30 MHz and 300 GHz both inclusive can be mentioned, which preferably assumes 500 MHz to 10 GHz. It is to be noted that the frequency of the signal transmitted to the $RF_C$ electrode controlled by the signal source is preferably smaller compared to the frequencies of the signals transmitted to the $RF_A$ electrode and the $RF_B$ electrode which is controlled by a high-frequency electric signal source mentioned below. This is because the apparatus becomes complicated if the frequency of the signal transmitted to the $RF_C$ electrode controlled by the signal source is larger compared to the frequencies of the signals transmitted to the $RF_A$ electrode and the $RF_B$ electrode controlled by high-frequency electric signal source hereinafter described.

The high-frequency electric signal source is a device for providing a high-frequency electric signal to optical frequency shift keying modulator, and a known high-frequency electric signal source can be adopted. The high-frequency electric signal source mainly controls a signal transmitted to the $RF_A$ electrode and the $RF_B$ electrode. As frequencies of the high-frequency, e.g. 1 GHz to 100 GHz can be mentioned. As an output of high-frequency signal source, a sinusoidal wave having a fixed frequency can be mentioned.

An optical FSK signal comprises an upper side-band (USB) signal and a lower side-band (LSB) signal on carrier ($f_0$). In this specification, the width of frequency modulation by the Optical FSK modulator (in other words, frequency of RF modulation signal from modulator) is set to be ($f_m$). Suppose the central frequency of carrier is ($f_0$), the central frequency of the USB signal is ($f_0+f_m$), and the central frequency of the LSB signal is ($f_0-f_m$).

So far the optical FSK modulator is mainly explained, the DSB-SC modulator can be manufactured in the same way and the same signal source, etc. can be used as needed.

As a wavelength of light inputted to the DSB-SC modulator, 1550 nm can be mentioned. As an optical source, a laser diode and an LED can be mentioned, but the source is not specifically limited to them.

2. Operation of a Forth Harmonic Generating System

Hereinafter, a basic operation of the forth harmonic generating system is described. First, light is inputted to the first DSB-SC modulator (2). This light is generally called an optical carrier, and it generally has a single wavelength. The frequency of this carrier signal is assumed to be ($f_0$[Hz]). And then, the signal source (4) applies a modulating signal such as a radio frequency signal to the DSB-SC modulator, and the DSB-SC modulator modulates the carrier signal. The frequency of this modulating signal (modulating frequency) is set to be ($f_m$[Hz]). It is to be noted that as the $f_m$[Hz], 1 MHz to 100 GHz and preferably 1 GHz to 10 GHz can be mentioned, and 10 GHz to 40 GHz may also be mentioned. Especially, if a modulating signal of around 40 GHz is used, a radio signal of around 160 GHz can be generated as described below.

Figure 2:
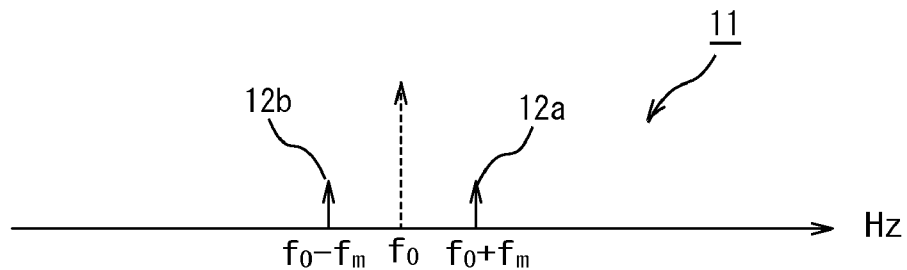
FIG. 2 is a conceptual diagram showing an ideal DSB-SC modulating signal outputted from a DSB-SC modulator.

FIG. 2 is a conceptual diagram showing an ideal DSB-SC modulating signal outputted from the DSB-SC modulator. As shown in FIG. 2, as the ideal DSB-SC modulating signal (11), a carrier signal is suppressed (in other words, signal of ($f_0$[Hz]) disappears), and a double side-band (side-band) signal (12) is outputted. The frequency of the side-band signal (12) is ($f_0\pm$[Hz]). The side-band signal having frequency ($f_0+f_m$[Hz]) is the upper side-band (USB) signal (12a), and the side-band signal having frequency ($f_0-f_m$[Hz]) is the lower side-band (LSB) signal (12b).

The USB signal ($f_0+f_m$[Hz]) and LSB signal ($f_0-f_m$[Hz]) outputted from the first DSB-SC modulator are respectively modulated by the second DSB-SC modulator. In other words, the USB signal ($f_0+f_m$[Hz]) (12a) outputted from the first DSB-SC modulator is modulated into a USB signal ($f_0+2f_m$[Hz]) (13a) and an LSB signal ($f_0$[Hz]) (13b) by the second DSB-SC modulator. On the other hand, the LSB signal ($f_0-f_m$[Hz]) (12b) outputted from the first DSB-SC modulator is modulated into a USB signal ($f_0$[Hz]) (14a) and an LSB signal ($f_0-2f_m$[Hz]) (14b) by the second DSB-SC modulator.

Figure 3:
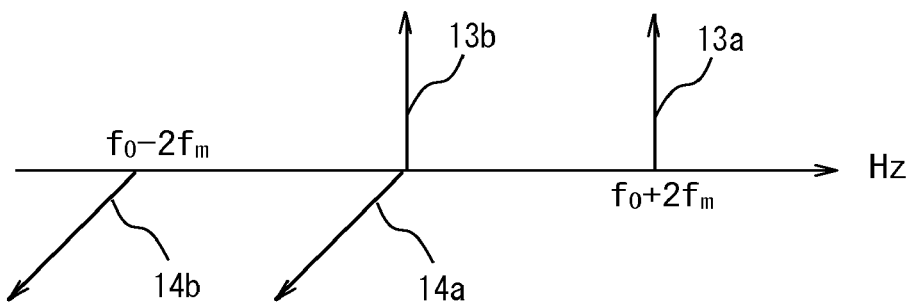
FIG. 3 is a conceptual diagram showing an example of an output signal from the second DSB-SC modulator without phase control of a modulating signal applied to the first and the second DSB-SC modulator.

FIG. 3 is a conceptual diagram showing an example of an output signal from the second DSB-SC modulator when a phase of a modulating signal applied to the first DSB-SC modulator and the second DSB-SC modulator is not controlled. As shown in FIG. 3, since two frequency components of ($f_0$) are not offset from each other, a frequency component of ($f_0$) remains in the output signal. It is to be noted that two DSB-SC modulators simply connected in tandem as shown in FIG. 3 is also not known. Signals having frequencies ($f_0+2$ μm), ($f_0$) and ($f_0-2f_m$) can be generated by this system. This can be used in a variety of potential application areas.

On the other hand, in the system of this aspect of the present invention, the frequency component of ($f_0$) of an output signal can be reduced by adjusting a phase of a modulating signal applied to the two DSB-SC modulators so that the two frequency components of ($f_0$) are offset from each other. In order to reduce the frequency component of ($f_0$) of the output signal, the phase difference between the two frequency components of ($f_0$) may be adjusted so as to be larger than 90°. The difference may also be in somewhere between 145° to 180° both inclusive, 170° to 180° both inclusive, or 175° to 180° both inclusive. It is most preferable that the phase difference is equal to 180°.

Figure 4:
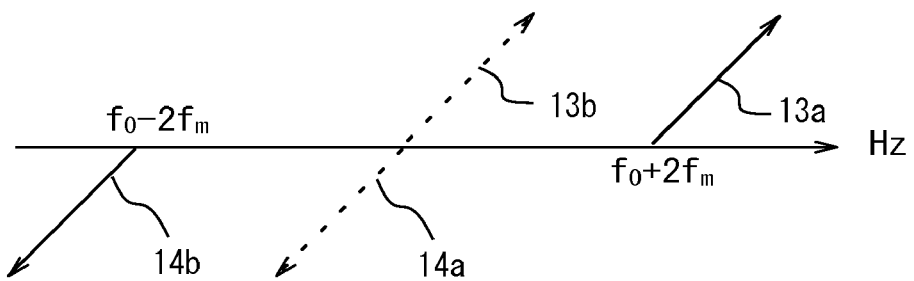
FIG. 4 is a conceptual diagram showing an ideal output by a forth harmonic generating system of the present invention.

FIG. 4 is a conceptual diagram showing an ideal output by the forth harmonic generating system of the present invention. As shown in FIG. 4, by using the system of the present invention, two signals of frequencies ($f_0\pm2f_m$) can be generated since the two frequency components of $f_0$ ideally cancel each other. This is an ideal case. In reality, it can be assumed that components of frequencies ($f_0\pm2f_m$) remain a little as a component intensity of frequency ($f_0$). The component intensity of frequency ($f_0$) (the maximum level intensity) is preferably be equal to or less than ½ of the component intensity of frequencies ($f_0\pm2f_m$). Note that these two signal intensities of frequencies ($f_0\pm2f_m$) are ideally the same, but in reality, they are different from each other slightly. So, a signal with lower intensity is applied. The component intensity of frequency ($f_0$) may also be equal to or less than ⅓, ¼, ⅕, ⅙, ⅛, ¹⁄₁₀, and ¹⁄₁₀₀ of the component intensity of frequency ($f_0\pm2f_m$).

In order to generate the phase difference mentioned above, the phase of the modulating signal applied to the second DSB-SC modulator may be shifted from the phase of the signal applied in the first DSB-SC modulator by the frequency range mentioned above. In particular, the phase of the modulating signal may be delayed by 90° or advanced by 90°.

3. Another Embodiment of a Forth Harmonic Generating System

The forth harmonic generating system, for example, can be realized by a system using an optical double sideband suppressed carrier modulator, a circulator, and a mirror. Since this system contains only one DSB-SC modulator, the installation space of the system can be saved and the cost can be reduced.

Figure 5:
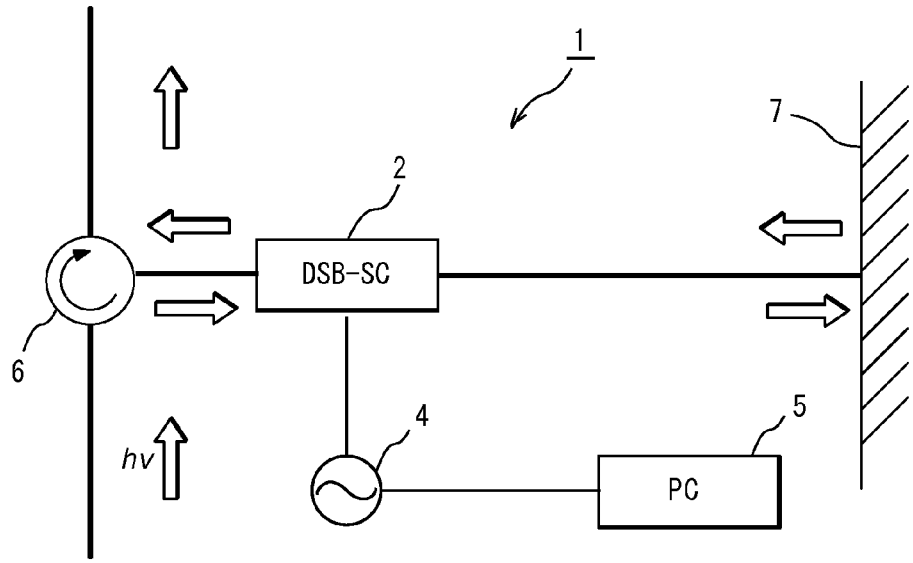
FIG. 5 is a diagram showing a basic arrangement of a fourth harmonic generating system using a mirror.

FIG. 5 is a diagram showing a basic arrangement of the fourth harmonic generating system using a mirror. As shown in FIG. 5, this embodiment of the fourth harmonic generating system is provided with a waveguide transmitting light, a circulator (6) connected with the waveguide and controlling the direction of the light, a DSB-SC modulator in which the light is inputted from the circulator, a mirror (7) reflecting an output from the DSB-SC modulator, a waveguide to which an optical signal reflected by the mirror, modulated by the DSB-SC modulator and emitted to the circulator is outputted, a signal source applying a modulating signal to the DSB-SC modulator, and a controller controlling phase and time of the modulating signal of the signal source.

And when the DSB-SC modulator modulates the light reflected from the mirror, the controller controls the output signal of the signal source so that the phase is shifted from the phase obtained by the former DSB-SC modulation in the way as described in the above embodiment. By doing this, similar to the former embodiment, the two frequency components of ($f_0$) cancel each other, reducing the frequency components of ($f_0$) of an output signal.

4. Generating Method of an Optical Signal Suppressing a Carrier

The embodiments of generating method of an optical signal are explained in the following. This generating method of an optical signal is basically a method which enables to generate an optical signal of frequency ($f_0 \pm 2f_m$) from an output signal by suppressing the frequency component of ($f_0$) by carrier-suppressed DSB-SC modulation.

To be concrete, the generation method of an optical signal is one using a system provided with a first optical double side-band suppressed carrier modulator (2), a second optical double side-band suppressed carrier modulator (3) connected in tandem to the first optical double side-band suppressed carrier modulator (2); a signal source (4) for generating a modulating signal applied to the first optical double side-band suppressed carrier modulator (2) and the second optical double side-band suppressed carrier modulator (3); and a signal controller (5) controlling the modulating signal applied to the first optical double side-band suppressed carrier modulator (2) and the second optical double side-band suppressed carrier modulator (3) by the signal source (4) so that a lower side-band signal generated by modulating the upper side-band signal of the first optical double side-band suppressed carrier modulator (2) by means of the second optical double side-band suppressed carrier modulator (3) and an upper side-band signal generated by modulating the lower side-band signal of the first optical double side-band suppressed carrier modulator (2) by means of the second optical double side-band suppressed carrier modulator (3) cancel each other, wherein the first optical double side-band suppressed carrier modulator (2) or the second optical double side-band suppressed carrier modulator (3) or the both are optical modulators provided with a first sub Mach-Zehnder waveguide, a second sub Mach-Zehnder waveguide, a main Mach-Zehnder waveguide containing the first sub Mach-Zehnder waveguide and the second sub Mach-Zehnder waveguide, and having an input part of light and an output part of modulated light, a first sub Mach-Zehnder electrode for adjusting voltage applied to two arms of the first Mach-Zehnder waveguide, a second sub Mach-Zehnder electrode for adjusting voltage applied to two arms of the second Mach-Zehnder waveguide and a main Mach-Zehnder electrode for adjusting voltage applied to a Mach-Zehnder waveguide.

And the generation method of an optical signal is comprising the steps of (i) adjusting bias voltages of the main Mach-Zehnder electrode and the two sub Mach-Zehnder electrodes so that an output from the main Mach-Zehnder waveguide is augmented, (ii) adjusting bias voltage of the main Mach-Zehnder electrode so that an output from the main Mach-Zehnder waveguide is reduced, (iii) reducing bias voltage of one of the sub Mach-Zehnder electrodes so that an output from the main Mach-Zehnder waveguide is reduced, and (iv) adjusting bias voltages of the main Mach-Zehnder electrode so that an output from the main Mach-Zehnder waveguide is reduced.

Also, another generating method of an optical signal based on the above embodiment is one comprising the steps of: (i) adjusting bias voltages of the main Mach-Zehnder electrode and the two sub Mach-Zehnder electrodes so that an output from the main Mach-Zehnder waveguide is maximized; (ii) adjusting bias voltage of the main Mach-Zehnder electrode so that an output from the main Mach-Zehnder waveguide is minimized; (iii) reducing bias voltage of one of the sub Mach-Zehnder electrodes so that an output from the main Mach-Zehnder waveguide is minimized; and (iv) adjusting bias voltages of the main Mach-Zehnder electrode so that an output from the main Mach-Zehnder waveguide is minimized.

In other words, in order to perform carrier suppressed DSB-SC modulation, an optical modulation method for suppressing a carrier (referred to as "the optical modulation method of the present invention") is used in the DSB-SC modulator. Since an optical FSK modulator can be used as a DSB-SC modulator in the present invention, the FSK modulator is used in the following explanation.

The optical modulation method of the present invention is basically one for improving an extinction ratio by controlling bias voltage applied to a Mach-Zehnder (MZ) waveguide and an optical modulator electrode having an optical intensity correction mechanism provided on each arm of the MZ waveguide. The modulation method comprises the steps of: (i) adjusting bias voltages of an electrode C and two sub MZ electrodes so that an output from a main MZ waveguide is augmented; (ii) adjusting bias voltage of the electrode C so that an output form the main MZ waveguide is reduced; (iii) reducing bias voltage of one of the sub MZ electrodes so that an output form the main MZ waveguide is reduced; (iv) adjusting bias voltage of the electrode C so that an output form the main MZ waveguide is reduced. This kind of modulation method comprises the steps of: (i) adjusting bias voltage of the $DC_C$ electrode or the $RF_C$ electrode so that an output from the main MZ waveguide is maximized; (ii) adjusting bias voltage of the $DC_C$ electrode or the $RF_C$ electrode so that an output from the main MZ waveguide is minimized; (iii) increasing or decreasing bias voltage of the $DC_A$ electrode or the $DC_B$ electrode; (iv) adjusting bias voltage of an electrode controlling the sub MZ waveguide whose output reduced in the former step so that an output from the sub MZ waveguide is minimized; (v) adjusting bias voltage of the $DC_C$ electrode or the $RF_C$ electrode so that an output from the main MZ is minimized. And this optical modulation method, by repeating the above step (iv) and (v), realizes a high extinction ratio. Especially, in the present invention, an optimal bias voltage can be obtained by correcting unbalance between the arms of the main MZ waveguide by using the sub MZ waveguide.

The optical intensity correction mechanism is generally provided for an optical modulator having the MZ waveguide.

As the optical intensity correction mechanism, for example, an electrode functioning as a heater or an electric field control mechanism can be mentioned.

(Explanation of a Method for High Extinction Ratio Modulation of the Present Invention)

Hereinafter, a modulation method for achieving a high extinction ratio of the present invention is explained. The modulation method for obtaining a high extinction ratio of the present invention basically comprises the following steps of: (i) adjusting bias voltages of a main MZ electrode (an electrode C) and two sub MZ electrodes so that an output from the main MZ waveguide is augmented; (ii) adjusting bias voltage of the electrode C so that an output form the main MZ waveguide is reduced; (iii) reducing bias voltage of one of the sub MZ electrodes so that an output form the main MZ waveguide is reduced; (iv) adjusting bias voltage of the electrode C so that an output form the main MZ waveguide is reduced. And more specifically, the method comprises the steps of: (i) adjusting each bias voltage so that the output is maximized; (ii) adjusting bias voltage of the $RF_C$ electrode so that the out is minimized; (iii) increasing or decreasing (slightly) a predetermined level of bias voltage of the $DC_A$ electrode or the $DC_B$ electrode, reducing an output of one electrode and augmenting an output of the other electrode; (iv) adjusting bias voltage of an electrode whose output decreased so that the output is minimized; (v) adjusting bias voltage of the $DC_C$ electrode so that the output is minimized. Note that it is a preferable embodiment to repeatedly perform the above step (iii) and (iv). Each step is explained below.

(i) A step of adjusting bias voltages of a main MZ electrode (an electrode C) and two sub MZ electrodes so that an output from the main MZ waveguide is augmented. A step of adjusting bias voltage so that an output from the main MZ is maximized.

This step is one for adjusting bias voltages of an electrode C and two sub MZ electrodes so that an output from the main MZ is augmented (preferably augmented as much as possible, more preferably maximized). In other words, this step is one for adjusting bias voltage applied to a $DC_A$ electrode 25, a $DC_B$ electrode 26, and an $RF_C$ electrode 29 so that an intensity of an output light from $MZ_C$ 24 is augmented. Since the main MZ waveguide $MZ_C$ 24 is connected to a measurement system not shown in figures, each bias voltage applied to each MZ electrode may be adjusted by observing output levels of the measurement system.

Also, a measurement system may be connected to a power supply system providing each bias voltage via a control device, and each bias voltage may be controlled so that an optical intensity measured by the measurement system is increased. The control device is provided with an input unit inputting information, an output unit outputting information, a memory unit (including memory and main memory) storing information, and a computing unit such as CPU performing arithmetic operations. Information on optical intensity measured by the measurement system is inputted to the control device by the input unit, and stored in the memory. The CPU of the control device, based on a direction from a controlling program of the main memory, retrieves the information on optical intensity from the memory. Also, the CPU of the control device, based on a direction from a controlling program of the main memory, outputs a signal changing bias voltages applied to any one of one or two or more electrodes from the output unit. By doing this, the intensity level of output light changes. The control device, retrieving the information and comparing it to the former optical intensity, outputs a direction of changing bias voltage so as to increase the optical intensity from the output unit. A power source which received this output signal, based on the direction, changes voltage levels applied to each electrode, thereby increasing the optical output.

(ii) A step of adjusting bias voltage of the electrode C so that an output from the main MZ waveguide is reduced. A step of adjusting bias voltage of the $RF_C$ electrode so that an output from the main MZ waveguide is minimized.

This step is one for adjusting bias voltage applied to a main $MZRF_C$ electrode so that an intensity of output light from the main MZ waveguide $MZ_C$ 24 is reduced. Since the main MZ waveguide $MZ_C$ 24 is connected to a measurement system not shown in figures, bias voltage applied to the main $MZRF_C$ electrode may be adjusted by observing output levels of the measurement system.

Also, a measurement system may be connected to a power supply system providing bias voltage to the main $MZRF_C$ electrode via a control device, and bias voltage of the main $MZRF_C$ electrode may be controlled so that an optical intensity measured by the measurement system is reduced. Information on optical intensity measured by the measurement system is inputted to the control device by the input unit, and stored in the memory. The CPU of the control device, based on a direction from a controlling program of the main memory, retrieves the information on optical intensity from the memory. Also, the CPU of the control device, based on a direction from the controlling program of the main memory, outputs a signal changing bias voltage applied to an $RF_C$ electrode of the main MZ from the output unit. By doing this, the intensity level of output light changes. The control device, retrieving the information and comparing it to the former optical intensity, outputs a direction of changing bias voltage so as to reduce the optical intensity from the output unit. A power source which received this output signal, based on this direction, changes voltage levels applied to the main $MZRF_C$ electrode, thereby reducing the optical output.

(iii) A step of reducing bias voltage of one of the sub MZ electrodes so that an output from the main MZ waveguide is reduced. A step of increasing or decreasing bias voltage of the $DC_A$ electrode or the $DC_B$ electrode.

This step is one for reducing bias voltage of one of sub MZ electrodes so that an output form the main MZ waveguide is reduced. In this step, since an output from the main MZ waveguide is reduced with a reduction in bias voltage of one of the sub MZ electrodes, bias voltage of the sub MZ electrode to which an output from the main MZ waveguide is reduced is controlled to be reduced. In other words, this step is one for slightly increasing or decreasing bias voltage of the $DC_A$ electrode or the $DC_B$ electrode. In this step, the electrode whose voltage level is forced to be changed may be predetermined, and the amount of increase or decrease in the voltage level may also be predetermined. As this change in voltage level, 0.01V to 0.5V can be motioned, and preferably, 0.05V to 0.1V can be mentioned. In this step, an output intensity of one of the MZ waveguides is decreased, and that of the other MZ waveguide is increased. Since the main MZ waveguide $MZ_C$ 24 and the sub MZ is, for example, connected to a measurement system not shown in figures, bias voltage may be adjusted by observing output levels of the measurement system.

Also, the measurement system may be connected to a power supply system providing bias voltages to the $DC_A$ electrode A and the $DC_B$ electrode B via a control device, and the bias voltages applied to the $DC_A$ electrode A and the $DC_B$ electrode B may be controlled. In this process, information on the electrode whose voltage level is changed or information on voltage change level may be stored in a memory and the like. The CPU of the control device, based on a direction from a controlling program of the main memory, retrieves control information stored in the memory, and outputs a signal changing bias voltage applied to the $DC_A$ electrode A or the $DC_B$ electrode B from the output unit. By doing this, the bias voltage applied to the $DC_A$ electrode A or the $DC_B$ electrode B changes by a predetermined level. If the bias voltages level applied to the $DC_A$ electrode A or the $DC_B$ electrode B changes by predetermined level, the intensity level of output light from the main and sub MZ changes. Information on optical intensity measured by the measurement system is inputted to the input unit, and stored in the memory. The CPU of the control device, based on a direction from a controlling program of the main memory, retrieves the information on the optical intensity from the memory, and then, from the output unit, outputs a direction of changing bias voltage applied to an electrode controlling the sub MZ waveguide whose optical output is reduced so as to reduce the optical intensity from the main MZ waveguide. The power source, which received this output signal, based on the direction, changes voltage levels applied to the electrode, thereby reducing the optical output.

(iv) A step of adjusting bias voltage of the electrode C so that an output of the main MZ waveguide is reduced. (iv) A step of adjusting bias voltage of an electrode controlling the sub MZ whose output decreased in the former step so that an output form the sub MZ is minimized.

This step is one for adjusting bias voltages of an electrode C so that an output from the main MZ waveguide is minimized. Since the main MZ waveguide is connected to a measurement system not shown in figures, for example, bias voltage may be adjusted by observing output levels of the measurement system. Note that, the present step or the former step (iii) and the present step may be repeatedly performed. This step is one for adjusting bias voltage applied to a sub MZ waveguide whose intensity of optical output decrease so as to reduce the intensity of output light from the sub MZ. Since the sub MZ is connected to a measurement system not shown in figures, bias voltage may be adjusted by observing output levels of the measurement system.

The measurement system is connected to a power supply system providing bias voltage to the $DC_A$ electrode and the $DC_B$ electrode via a control device, and the bias voltage applied to the $DC_A$ electrode and the $DC_B$ electrode may be controlled. The CPU of the control device, based on a direction from a controlling program of the main memory, retrieves control information stored in the memory, and outputs a signal changing bias voltage applied to the $DC_A$ electrode or the $DC_B$ electrode from the output unit. By doing this, bias voltage applied to the $DC_A$ electrode or the $DC_B$ electrode changes by a predetermined level.

(v) A step of adjusting bias voltage of the $RF_C$ electrode so that an output form the main MZ is minimized.

This step is one for adjusting bias voltage of the $RF_C$ electrode so that an output of the main MZ is minimized. Since the main MZ is connected to a measurement system not shown in figures, bias voltage may be adjusted by observing output levels of the measurement system.

The measurement system is connected to a power supply system providing bias voltage to the $RF_C$ electrode C via a control device, and the bias voltage applied to the $DC_A$ electrode and the $DC_B$ electrode C may be controlled. The CPU of the control device, based on a direction from a controlling program of the main memory, retrieves control information stored in the memory, and outputs a signal changing bias voltage applied to the $DC_A$ electrode or the $DC_B$ electrode C from the output unit. By doing this, the bias voltage applied to the $DC_A$ electrode or the $DC_B$ electrode C changes by a predetermined level.

A Step of Repeating the Above Step (iv) and (v)

By repeating the above step (iv) and (v), output is reduced, and hence a bias point where the extinction ratio increases can be obtained. By observing an output level via a measurement system not shown in figures, bias voltage is adjusted and a preferable bias point can be obtained.

The CPU of the control device, based on a direction from a controlling program of the main memory, retrieves control information or information on the output light both stored in the memory, and may make a decision to stop adjusting bias voltage. It may also feedback information on the intensity of an output light from the measurement system, and may keep adjusting bias voltage.

In the above example, a modulation method using the optical FSK modulator was explained. This method can also be applied to a case where an optical SSB modulator is used. And, this is also true to a case where a DSB-SC modulator is used.

5. Radio Signal Generator

Figure 6:
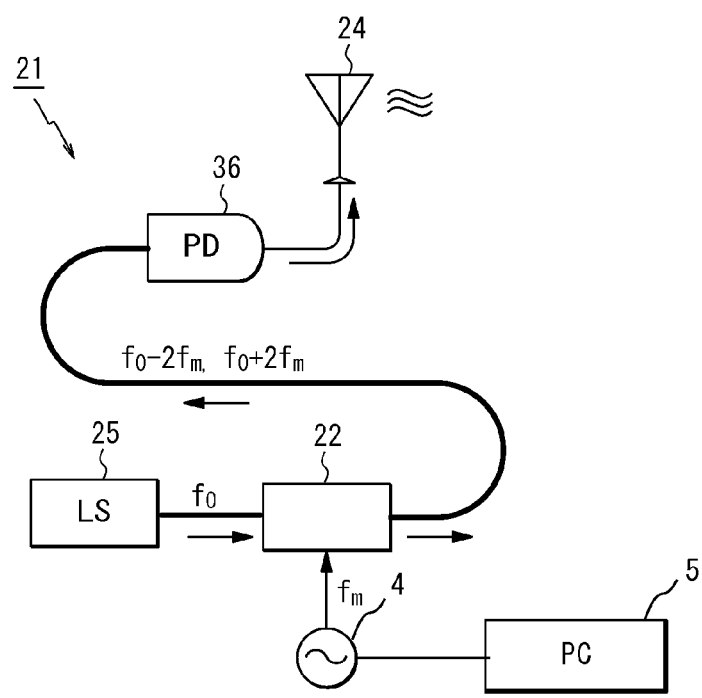
FIG. 6 is a block diagram showing a basic arrangement of a radio signal generator using the above-mentioned fourth harmonic generating system.

FIG. 6 is a block diagram showing a basic arrangement of a radio signal generator using the above-mentioned fourth harmonic generating system. As shown in FIG. 6, the second aspect of the radio signal generator (21) of the present invention is provided with a fourth harmonic generating system (22) as a modulating optical signal generator connectable to an optical source, an optical detector (23) detecting an output light from the modulating optical signal generator, and an antenna (24) converting an optical signal detected by the modulating optical signal generator to a radio signal. And it is a radio signal generator (21) generating a radio signal with a predetermined frequency by controlling a modulating frequency of the modulating optical signal generator. As an optical source (25), the one explained in the above can be used as needed.

6.1 Optical Detector

An optical detector is a means for detecting an output light from a modulating optical signal generator, and converting the output light to an electric signal. As the optical detector, a known optical detector can be adopted, and a device including photodiode, for example, can be adopted. A high-speed optical detector which can perform high-speed detecting is particularly preferable. As the optical detector, for example, the one for detecting an optical signal and converting it to an electric signal can be mentioned. The intensity, frequency, etc of an optical signal can be detected by the optical detector. As the optical detector, for example, the one described in [Hirho Yonetsu, "Optical Communication Element Engineering (light-emitting, light-receiving element)" Kougakutosyo Ltd. the 6th edition, 2000] can be adopted as needed.

6.2. Antenna

An antenna is a means for emitting an electrical signal converted by the optical detector as a radio signal. As an antenna, a known antenna can be used.

7. Operation of a Radio Signal Generator

The forth harmonic generating system, as a modulating optical signal generator (22), generates a signal of frequency $(f_0+2f_m)$ and a signal of frequency $(f_0-2f_m)$, which are detected by the optical detector, and emitted by the antenna after being converted into a radio signal. By doing this, a signal of frequency ($f_0+2f_m$) and a signal of frequency ($f_0-2f_m$) can be obtained.

Also, by using the above mentioned optical signal, by obtaining difference frequency, a radio signal of frequency ($4f_m$) can be easily obtained. Especially, if a signal of frequency ($f_0+2f_m$) and a signal of frequency ($f_0-2f_m$) are obtained by a carrier suppressing DSB-SC modulation, since the carrier component is suppressed, a radio signal with high quality can be obtained.

EMBODIMENT 1

Figure 7:
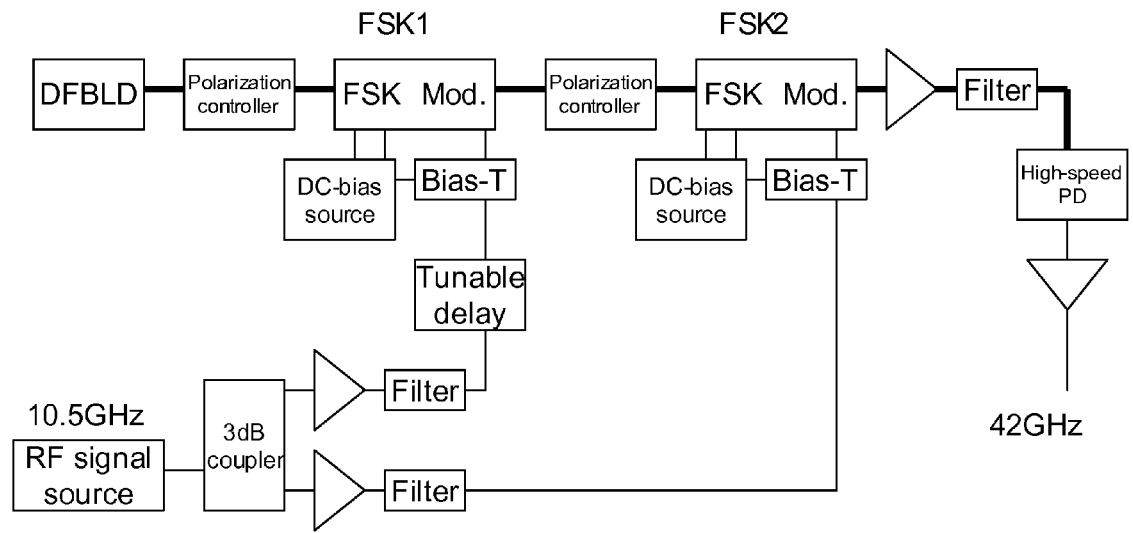
FIG. 7 is a block diagram showing a system of the present embodiment.

Hereinafter, the present invention is explained referring to an embodiment. FIG. 7 is a block diagram showing a system of the present embodiment. In FIG. 7, DFBLD represents a distributed-feedback laser diode, PC represents a polarization controller, FSK Mod. represents an optical frequency-shift keying modulator as a DSC-SC modulator, DC-bias source represents a source of DC bias voltage applied to an optical frequency-shit keying modulator, RF signal source represents a radio frequency signal source as a modulating signal source, Tunable delay represents a variable delay device for providing an arbitrary time difference between modulating signals of the two optical modulators, High-speed PD represents a high-speed optical detector, and triangles in the figure represent any amplifier. Modulating frequency of 10.5 GHz was used. Frequency of output signal from the high-speed optical detector was 42 GHz.

Figure 8:
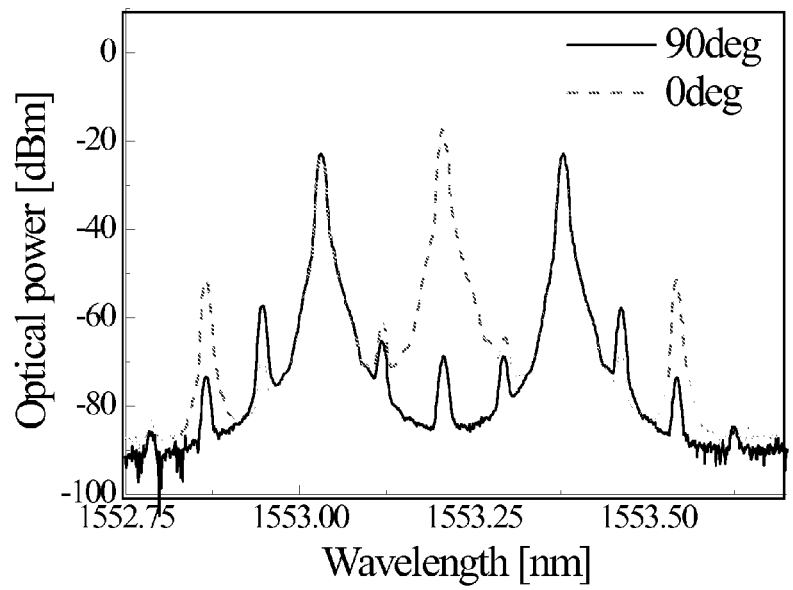
FIG. 8 is a spectrum diagram showing an output from the second modulator of the system shown in FIG. 7.

FIG. 8 is a spectrum diagram showing an output from the second modulator of the system shown in FIG. 7. The solid line is a spectrum which is obtained by providing a phase shift of 90° to modulating signals applied to two modulators. The dotted line is a spectrum which is obtained without a phase shift. The vertical axis represents the optical intensity of spectrum [dBm], and the horizontal axis represents wavelength [nm]. The optical intensity inputted to the system was 12.7 dBm, the losses in polarization controllers were respectively 1.1 dB and 0.4 dB, the modulating signal intensities in the first and second modulator were respectively 20.9 dBm and 21.0 dBm. The efficiency of conversion was −31 dB. The suppression ratios of a 0-order signal and a first-order signal to a second high-order light were equal to or more than 40 dB, and the suppression ratio of a third-order signal was 34 dB. The intensities of each side-band component are shown in Chart 1.

CHART 1

| The intensity of each side-band component | |
|---|---|
| order | intensity (dBm) |
| −5 | −85.754 |
| −4 | −73.369 |
| −3 | −57.322 |
| −2 | −22.888 |
| −1 | −65.313 |
| 0 | −68.69 |
| 1 | −68.78 |
| 2 | −22.911 |
| 3 | −57.779 |
| 4 | −73.495 |
| 5 | −84.62 |

FIG. 9 (A) to FIG. 9 (D) are spectra charts of radio frequency signals obtained in the present embodiment. FIG. 9 (A) shows a spectrum with resolution bandwidth (RBW) of 30 kHz. The vertical axis represents signal strength [dBm] and the horizontal axis represents frequency [GHz]. FIG. 9 (B) shows a spectrum with RBW of 1 Hz and a center frequency of 42 GHz. The vertical axis represents signal strength [dBm] and the horizontal axis represents frequency [GHz]. FIG. 9 (C) shows a spectrum with RBW of 10 Hz and a center frequency of 42 GHz. The vertical axis represents signal strength [dBm] and the horizontal axis represents frequency [GHz]. FIG. 9 (D) shows a spectrum with RBW of 1 MHz. The vertical axis represents signal strength [dBm] and the horizontal axis represents frequency [GHz].

It can be appreciated from FIG. 9 (A) that, according to the system of the present embodiment, a radio signal of 42 GHz, which is a fourth harmonic signal of modulating frequency 10.5 GHz, can be effectively obtained. It can be also appreciated from FIG. 9 (B) and FIG. 9 (C) that, the obtainable signal is relatively sharp and high quality with a line width of 1 Hz or less. The intensity of each high-order signal and the like can be appreciated from FIG. 9 (D). The relations between frequencies and spectrum intensities of each high-order signal are as follows: 10.5 GHz is −32.8 dBm; 21.0 GHz is −30.8 dBm; 31.5 GHz is −35.0 dBm; and 42.0 GHz is +11.0 dBm. And the spurious (unnecessary electromagnetic waves) suppression ratio was 41.8 dB.

FIG. 10 (A) and FIG. 10 (B) are graphs showing SSB (Single Side-Band) phase noise. FIG. 10 (A) is a graph showing a phase noise. FIG. 10 (B) is a graph showing a noise figure that is a ratio of phase noise to source. In FIG. 10 (A), the solid line shows a noise of radio frequency (42 GHz) which is outputted from the system of the embodiment 1, and the dotted line shows a noise of a modulating signal of 10.5 GHz. It can be appreciated from FIG. 10 (A) that, in the present system, a phase noise of −95.8 dBc at 10 kHz offset is achieved. It can also be appreciated from FIG. 10 (B) that the noise figure is equal to or less than 20LobN+6 dB, and is between 12 dB to 18 dB.

EMBODIMENT 2

Figure 11:
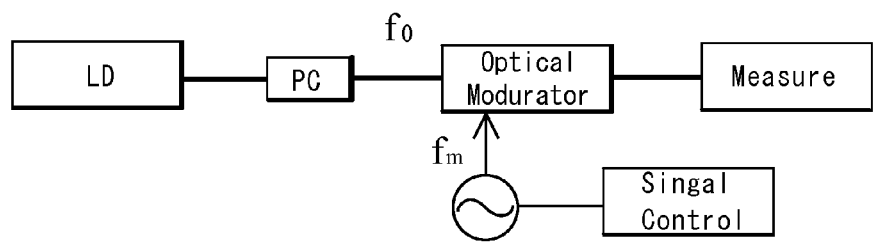
FIG. 11 is a schematic diagram showing an experimental system used in this experiment.

Demonstration Experiment of the Principle of High Extinction Ratio (On/Off) by Using a FSK modulator FIG. 11 is a schematic diagram showing an experimental system used in this experiment. In this example, an optical modulator as shown in FIG. 12 is used, and an RF signal and a DC signal are applied to an $RF_A$ electrode A and an $RF_B$ electrode B which are sub MZ waveguide electrodes. An intensity modulator with high extinction ratio is realized by adjusting an intensity balance between the arms of the main MZ by using the sub MZ of the FSK modulator. A DC bias was applied to the $RF_A$ electrode A the $RF_B$ electrode B, and the balance was adjusted. On-off switching was performed on the $RF_C$ electrode C.

The following elements are used in the experimental system. As an optical source, the combination of HP8166A and 81689A, respectively produced by Agilent Co., was used. The setting value was 1550 nm, and the observed value was 1549.925 nm. The setting value of intensity was 5.94 dBm, and the observed value of intensity was 2.68 dBm. An output light was inputted to the FSK modulator via a polarization controller. As a bias power source, the combination of three R6144s, produced by Advantest Co., and an Agilent 33250A as a function generator were used. As an optical modulator, T.SBX1.5-10-AOC-P-FN SN728x711 153-0001-001, produced by Sumitomo Osaka Sement Co., was used. As a measurement system, an Advantest Q8384 as an optical spectrum analyzer was used. The time domain waveform was set to zero span.

(i) Bias voltages of the electrode C and the two sub MZ electrodes were adjusted so as to maximize an output from the main MZ waveguide. As for the bias voltage applied to each electrode, Vπ of the electrode A and B was 4.2V, and Vπ of the electrode C was 6.1V. (ii) Bias voltage of the electrode C was adjusted so as to minimize an output from the main MZ waveguide. Bias voltages were −1.6V for the electrode A, −1.6V for the electrode B, and −1.1V for the electrode C. And the intensity of the output light was −0.44 dBm. (iii) Having confirmed that an output from the main MZ waveguide is minimized by reducing the bias voltage of $MZ_A$, the bias voltage of the electrode A was reduced so as to minimize an output from the main MZ waveguide. (iv) The bias voltage of the electrode C was adjusted so as to minimize an output from the main MZ waveguide. (i) The bias voltage was adjusted so as to minimize an output from the main MZ waveguide. As for the bias voltage applied to each electrode, Vpi of the $RF_A$ electrode and $RF_B$ electrode was 4.2V, and Vpi of the $RF_C$ electrode was 6.1V (ii) The bias voltage of the $RF_C$ electrode was adjusted so as to minimize an output from the main MZ. As a result, the bias voltage maximizing the output was −1.6V for the $RF_A$ electrode, −1.6V for the $RF_B$ electrode, −1.1V for the $RF_C$ electrode, and the intensity of the output light was −0.44 dBm. (iii) The bias voltage of $MZ_A$ was reduced. (iv) The bias voltage of $RF_A$ electrode was adjusted so as to minimize the output of the $MZ_A$ whose output was reduced in the former step. (v) The bias voltage of $RF_C$ was reduced so as to minimize the output of the main MZ. The above steps (iii) and (iv) were repeated until the variation of the output light is reduced. The eventual bias voltages applied to each electrode were: −2.35V for the RF A electrode A; −1.6V for the $RF_B$ electrode B; and −7.235V for $RF_C$ electrode C.

Figure 13:
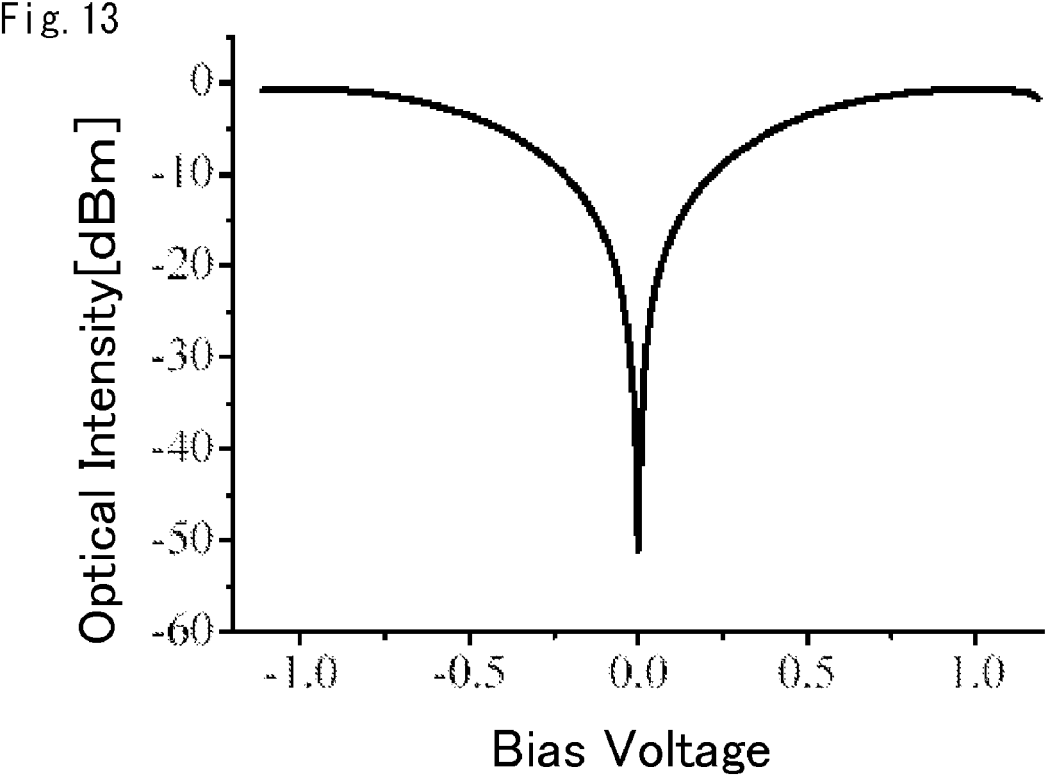
FIG. 13 is a graph showing a relationship between bias voltage of electrode C and output light intensity in embodiment 2. The horizontal axis is standardized by Vπ (6.1V) of the electrode C.

FIG. 13 is a graph showing a relationship between bias voltage of electrode C and output light intensity in embodiment 2. The horizontal axis is standardized by Vpiπ (6.1V) of the $RF_C$ electrode C. It can be appreciated from FIG. 13 that the maximum value of the optical intensity is −0.7 dB, the minimum value of the optical intensity is −51.0 dBm. The extinction ratio in the embodiment 2, therefore, is 50.3 dB. It is to be noted that when a negative voltage is applied in the step (ii), an output is minimized at −2.315V for the $RF_A$ electrode A and −7.22V for the $RF_C$ electrode C. On the other hand, when a positive voltage is applied in the step (ii), an output is minimized at −2.315V for the $RF_A$ electrode A and −7.22V for the $RF_C$ electrode C as well.

Figure 14:
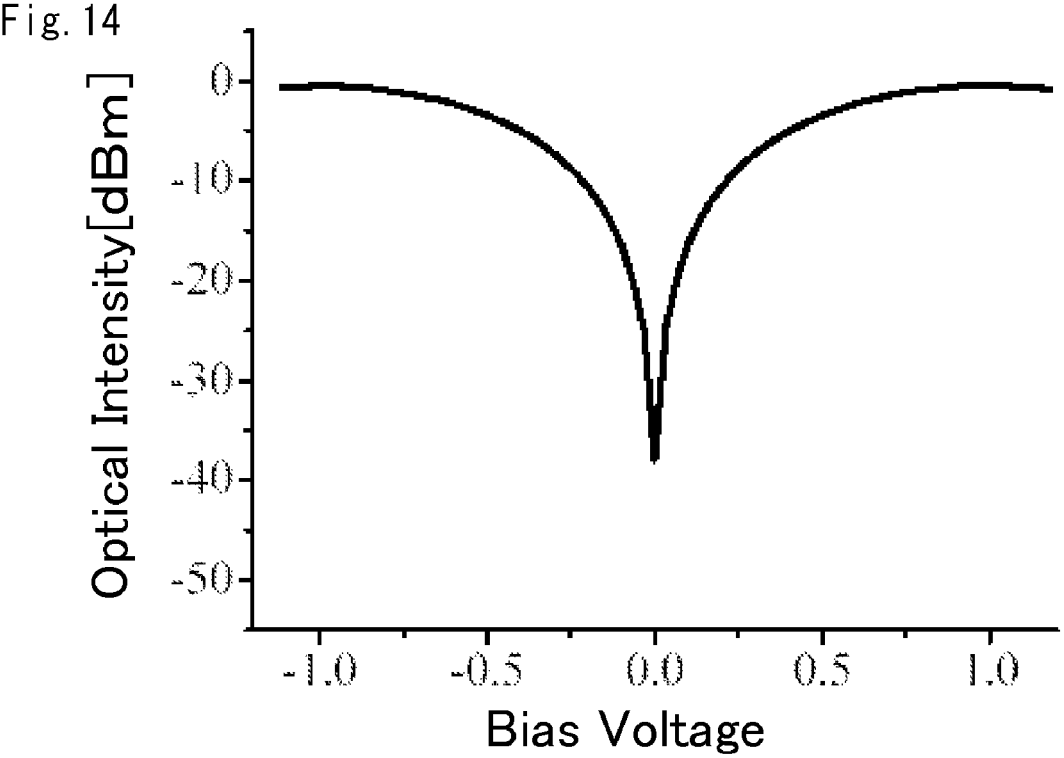
FIG. 14 is a graph showing a relationship between bias voltage of electrode C and output light intensity in comparative example 1. The horizontal axis is standardized by Vπ (6.1V) of the electrode C.

For comparison, a relationship between the bias voltage of the $RF_C$ electrode C and the output light intensity is measured without a balance adjustment performed in embodiment 2. FIG. 14 is a graph showing a relationship between bias voltage of RF c electrode C and output light intensity in comparative example 1. The horizontal axis is standardized by Vpiπ (6.1V) of the $RF_C$ electrode C. Note that bias voltage of $RF_A$ electrode A was −1.6V. The maximum value of the optical intensity was −0.4 dB, and the minimum value of the optical intensity was −37.9 dBm. The extinction ratio in a comparative example 1 was 37.5 dB.

Figure 15:
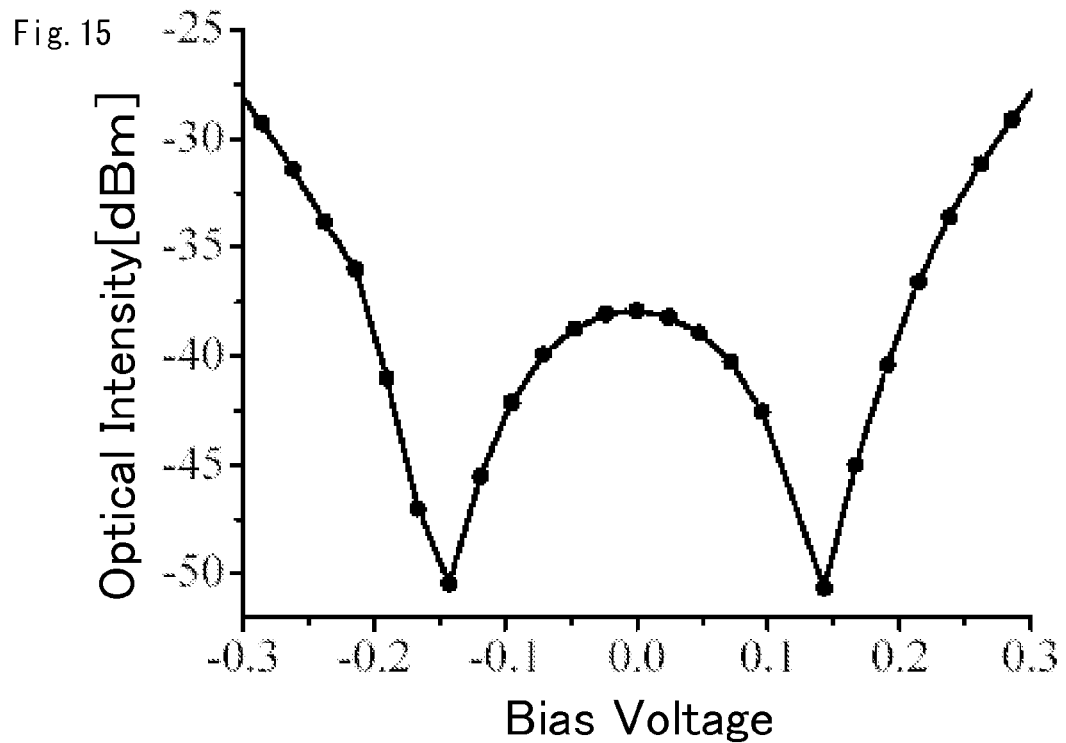
FIG. 15 is a graph showing a relationship between bias voltage of electrode A and output light intensity in comparative example 2. The horizontal axis is standardized by Vπ (4.2V) of the electrode A.

FIG. 15 is a graph showing a relationship between bias voltage of $RF_A$ electrode A and output light intensity in comparative example 2. The horizontal axis is standardized by Vpiπ (4.2V) of the $RF_A$ electrode A. The bias voltage (−1.7V) maximizing the output light intensity is set to be zero. When the standardized voltage was 0.143V, the output was minimized. Note that when the standardized voltage is negative, the output is minimized at −7.240V on the $RF_C$ electrode C, and when the standardized voltage is negative, the output is maximized at −7.245V on the $RF_C$ electrode C.

Figure 16:
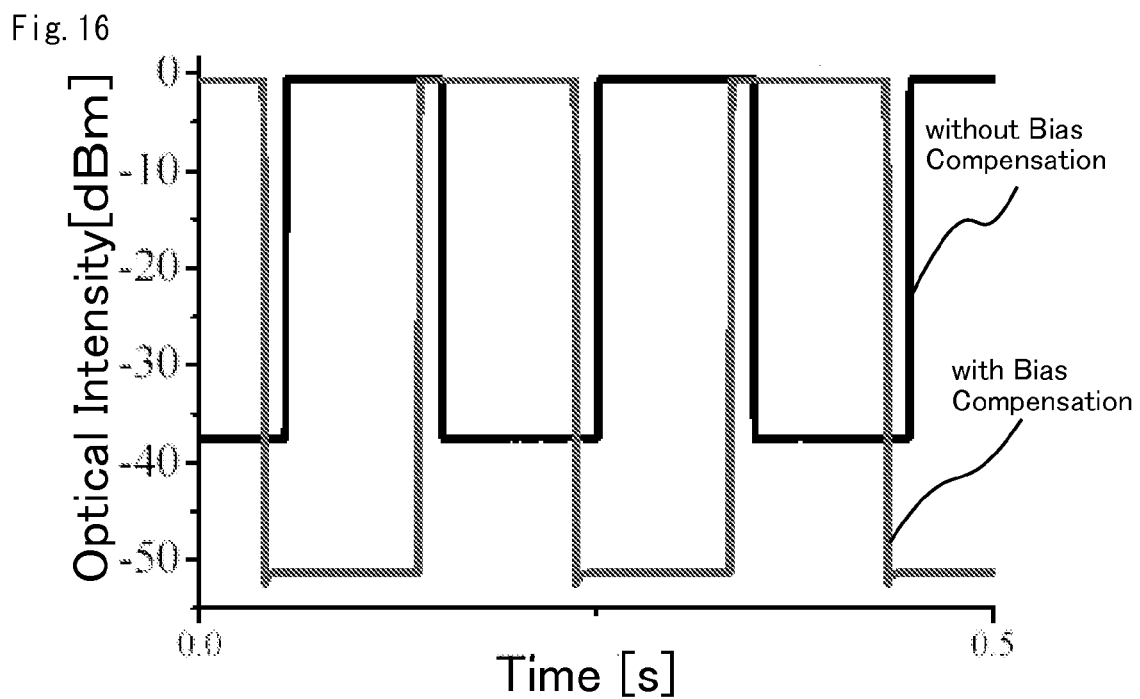
FIG. 16 is a graph showing a time domain waveform of output light in embodiment 2.

FIG. 16 is a graph showing a time domain waveform of output light in the embodiment 2. A voltage applied to the $RF_C$ electrode C was turned into a rectangular pulse signal by a function generator, and an output from the main MZ was measured with the optical spectrum analyzer which was set to zero frequency span. Note that the dark solid line represents an output with the bias adjusted (as shown in embodiment 2), and the weak solid line represents an output with the bias not adjusted (as shown in comparative example 1).

FIG. 17 is a graph showing a relationship between a wavelength and an output light when the wavelength of an output light from the optical source is 1550 nm, and the bias voltage is adjusted so that the output from the main MZ is minimized. FIG. 17 (B) is a graph whose scale of the horizontal axis is altered from that of FIG. 17 (A). It can be appreciated from these figures that an extinction ratio equal to or more than 45 dB can be achieved in wavelength shift range of around 1 nm. It can therefore be appreciated from the present invention that high extinction ratio can be achieved even when the optical wavelength is shifted due to a high-speed modulation.

Figure 18:
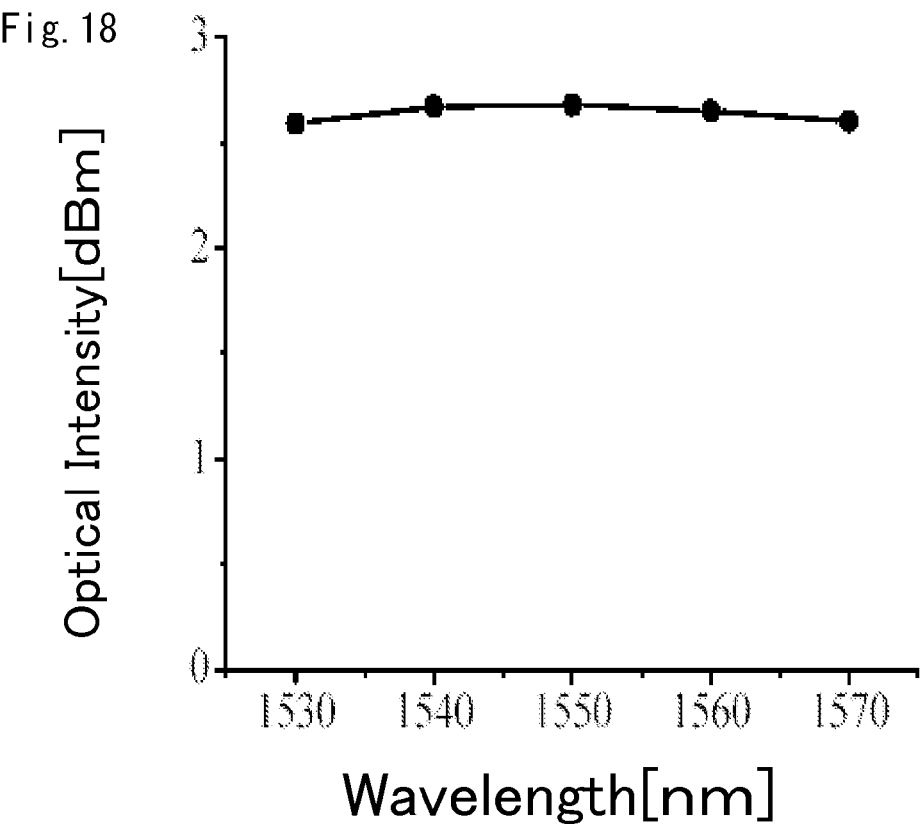
FIG. 18 shows the optical intensity of light inputted to an optical FSK modulator.

FIG. 18 shows the optical intensity of light inputted to the optical FSK modulator. When bias voltage applied only to $RF_C$ electrode C was changed, the extinction ratio was 50.3 dB. On the other hand, when bias voltage applied not only to the $RF_C$ electrode C but to the $RF_A$ electrode A, the extinction ratio became 50.6 dB. The increase in the extinction ratio was confirmed by adjusting bias voltage applied to the $RF_A$ electrode A. Since the extinction ratio under the condition of step (i) was 37.9 dB, it is understood that the extinction ratio was improved by 12.8 dB by the modulation method of the present invention. Also, when 14.3% of Vpiπ (5% of the optical intensity, 2.5% of the amplitude) was corrected, the extinction ratio was maximized. Note that when intensity unbalance between arms was 5% and no correction was performed, a remaining element is 32 dB at off time. Note that around 0.001% of radiation mode light is mixed in the input port.

EMBODIMENT 3

1. DSB-SC Modulation Using High Extinction Ratio On-Off by FSK Modulator

An improvement of a carrier suppression ratio at a time of DSC-SC modulation was attempted by adjusting an intensity balance between the arms of the main MZ by using the sub MZ of FSK modulator, and realizing an intensity modulator with high extinction ratio. By doing this, it is shown that an optical FSK modulator can be used as a DSB-SC modulator.

2. Experimental System

In the experimental system of embodiment 3, the following elements were used. As an optical source, the combination of HP8166A and 81689A, respectively produced by Agilent Co., was used. The setting value was 1550 nm, and the observed value was 1549.925 nm. The setting value of intensity was 5.94 dBm, and the observed value was 2.68 dBm. An output light was inputted to the FSK modulator via a polarization controller. As a bias power source, three R6144s, produced by Advantest Co. were used. As an optical modulator, T.SBX1.5-10-AOC-P-FN SN728x711 153-0001-001, produced by Sumitomo Osaka Sement Co., was used. As a measurement system, an Advantest Q8384 as an optical spectrum analyzer was used. As a power meter, AQ2733, produced by Ando Denki Co., was used. And, the time domain waveform was set to zero span. As a signal source of radio frequency signal, (i) a combination of SMR20, produced by Rode and Shwartz Co., and 83050A, produced by Agilent Co. was used. (or a combination of SMR20, produced by Rode and Shwartz Co., and 87300C, Power meter Agilent E4419, produced by Agilent Co., was used, and 4412A was used as an output monitor.), or (ii) SMR20, produced by Rode and Shwartz Co., SHF 200CP, produced by SHF Co., and BPF Band Pass Filter 8c7-10.5 G-50-S11 were used, and an RF signal without high frequency wave was generated at 10.5 G through BPF (Band Pass Filter).

3. Experiment Procedure

With or without a balance adjustment and with an off-state respectively, an RF signal of 10.5 GHz was supplied to the $RF_C$ electrode C. The allowable depth of modulation was limited to the extent that the third element does not exceed a carrier element whose balance was adjusted. (If the third element is predominant, high extinction ratio is not advantageous.) The optical spectrum was measured respectively. After amplification of the RF signal, the harmonic was suppressed by BPF. When the RF is supplied, the optimum bias for carrier suppression shifts a little. So, after the RF was supplied, the bias was readjusted.

4. Result

The bias voltage maximizing the output is respectively −1.6 V for the $RF_A$ electrode A, −1.5 V for the $RF_B$ electrode B, and −1.1 V for the $RF_C$ electrode C. The bias voltage minimizing the output is respectively −2.2 V for the $RF_A$ electrode A, −1.4 V for the $RF_B$ electrode B, and −7.16 V for the $RF_C$ electrode C. The following experiment was performed to compare the extinction ratios with or without balance correction of the present invention.

(i) Without balance correction of the present invention, on-off switching is performed by applying bias voltage of the $RF_C$ electrode C. The bias voltage maximizing the output intensity was respectively −1.6V for the $RF_A$ electrode A, −1.5V for the $RF_B$ electrode B, and −1.1V for the $RF_C$ electrode C. The measurement intensity of the power meter was +0.1 dBm, and the measurement intensity of OSA (Optical Spectrum Analyzer) was −0.3 dBm. On the other hand, the bias voltage minimizing the output intensity was respectively −1.6V for the $RF_A$ electrode A, −1.5V for the $RF_B$ electrode B, and −7.16V for the $RF_C$ electrode C. The measurement intensity of the power meter was −37.2 dBm, and the measurement intensity of OSA was −38.7 dBm. In other words, the extinction ratio was 37.3 dB as the measurement value of the power meter, and 38.4 dB as the measurement value of OSA.

(ii) Subsequently, with balance correction of the present invention, on-off switching is performed by applying bias voltage of the $RF_C$ electrode C. The bias voltage maximizing the output intensity is respectively −2.2V for the $RF_A$ electrode A, −1.5V for the $RF_B$ electrode B, and −1.1V for the $RF_C$ electrode C. The measurement intensity of the power meter was +0.0 dBm, and the measurement intensity of OSA was −0.4 dBm. On the other hand, the bias voltage minimizing the output intensity was respectively −2.2V for the $RF_A$ electrode A, −1.5V for the $RF_B$ electrode B, and −7.16V for the $RF_C$ electrode C. The measurement intensity of the power meter was −46.5 dBm, and the measurement intensity of OSA was −51.0 dBm. In other words, the extinction ratio was 46.5 dB as a measurement value of the power meter, and 50.6 dB as a measurement value of OSA. It is therefore understood that by performing the bias adjustment according to the present invention, high extinction ratio can easily be obtained.

Figure 19:
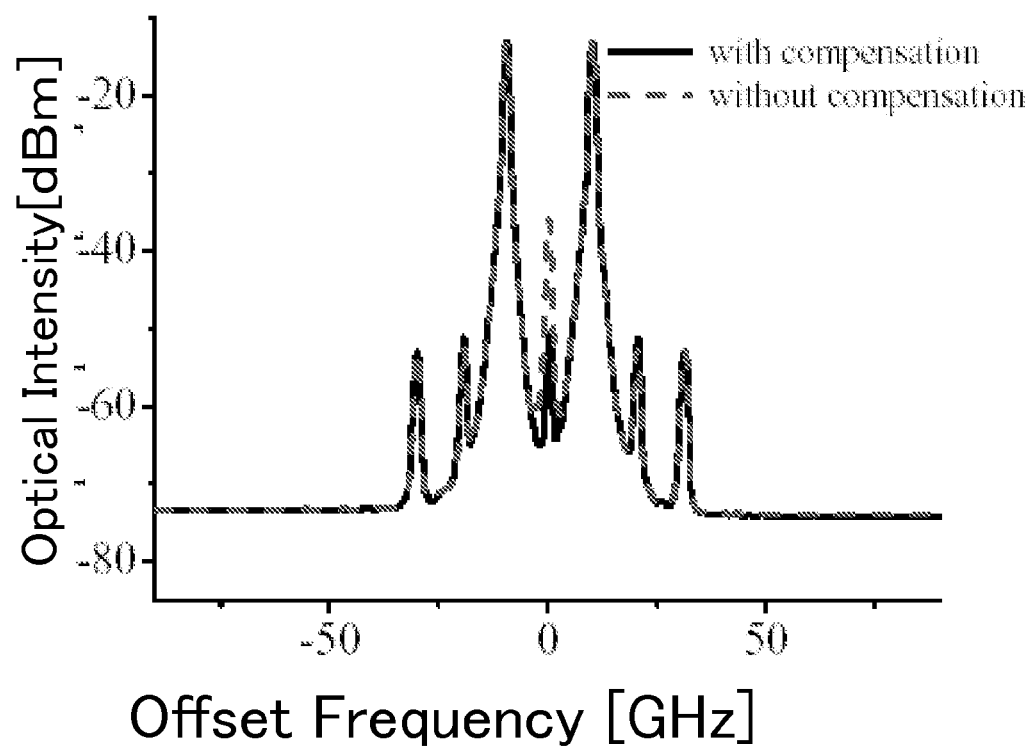
FIG. 19 shows a spectrum to confirm that carrier is suppressed by a balance correction of the present invention. The horizontal axis represents offset frequency [GHz] and the vertical axis represents output light intensity [dBm].

FIG. 19 shows a spectrum confirming carrier suppression by a balance correction of the present invention. The horizontal axis represents offset frequency [GHz] and the vertical axis represents output light intensity [dBm]. The solid line is a spectrum having performed a balance correction. The dotted line is a spectrum not having performed a balance correction. The bias voltages having performed a balance correction were respectively −2.33V for the $RF_A$ electrode A and −7.127V for the $RF_C$ electrode C. On the other hand, the bias voltages not having performed a balance correction were respectively −1.60V for the $RF_A$ electrode A and −7.110V for the $RF_C$ electrode C. The intensities of spectrum components of FIG. 19 are shown in Chart 2.

CHART 2

| The intensities of each spectrum (side-band) component | | |
|---|---|---|
| order | with correction | without correction |
| −3 | −53.1 | −53.0 |
| −2 | −51.1 | −52.7 |
| −1 | −13.1 | −13.0 |
| 0 | −50.6 | −35.9 |
| 1 | −13.1 | −13.0 |
| 2 | −51.2 | −52.7 |
| 3 | −53.0 | −52.9 |

The output intensity was −1.31 dBm for the first order harmonics and −53.1 dBm for the third order harmonics. The intensity of input light was −0.4 dBm for zero order harmonics. The induced phase calculated from the side-band of the first order harmonics and that of the third order harmonics was as follows: the first order/the third order=0.49; and zero order/the first order=0.46. And carrier suppression ratio was 50.2 dB. Suppose the induced phase of an arm was 0.48 and the input voltage was 2.8V (19 dBm), half-wavelength voltage was: 8/(0.48*2/3.14)=9.2V. This value was 10% higher than that of the inspection data. It can be seen from the FIG. 19 that the carrier was suppressed.

A preferred carrier-suppressed fourth harmonic wave signal can be generated by the above mentioned carrier suppressing DSB-SC modulation method.

The present invention can be used effectively in the field of optical information communication.

What is claimed is:

1. A fourth harmonic generating system using optical double side-band suppressed carrier modulators, the system comprising:
a first optical double side-band suppressed carrier modulator (2);
a second optical double side-band suppressed carrier modulator (3), the second optical double side-band suppressed carrier modulator (3) being connected in series to the first optical double side-band suppressed carrier modulator (2);
a signal source (4) for generating a modulating signal, the modulating signal being applied to the first optical double side-band suppressed carrier modulator (2) and the second optical double side-band suppressed carrier modulator (3); and
a signal controller (5) for controlling a modulating signal, the modulating signal being applied to the first optical double side-band suppressed carrier modulator (2) and the second optical double side-band suppressed carrier modulator (3) by the signal source (4), wherein "a lower side-band signal of the second optical double side-band suppressed carrier modulator (3) which is a modulated signal of an upper side-band signal of the first optical double side-band suppressed carrier modulator (2)" and "an upper side-band signal of the second optical double side-band suppressed carrier modulator (3) which is a modulated signal of a lower side-band signal of the first optical double side-band suppressed carrier modulator (2)" cancel each other, whereby a fourth harmonic signal is obtained.

2. The fourth harmonic generating system using optical double side-band suppressed carrier modulators as claimed in claim 1, wherein the signal controller (5) controls the modulating signal, the modulating signal being applied to the first optical double side-band suppressed carrier modulator (2) and the second optical double side-band suppressed carrier modulator (3) by the signal source (4), wherein phase difference between a lower side-band signal and an upper side-band signal is controlled to be 180°, the upper side-band signal being generated by the first optical double side-band suppressed carrier modulator (2), the lower side-band signal being generated by the second optical double side-band suppressed carrier modulator (3), wherein phase difference between a lower side-band signal and an upper side-band signal is controlled to be 180°, the lower side-band signal being generated by the first optical double side-band suppressed carrier modulator (2), the upper side-band signal being generated by the second optical double side-band suppressed carrier modulator (3).

3. The fourth harmonic generating system using optical double side-band suppressed carrier modulators as claimed in claim 1, wherein the signal controller (5) controls phase difference between the modulating signals to be 90 degrees, the modulating signals being applied to the first optical double side-band suppressed carrier modulator (2) and the second optical double side-band suppressed carrier modulator (3).

4. The fourth harmonic generating system using optical double side-band suppressed carrier modulators as claimed in claim 1, wherein a difference between a delay of an optical signal, which is inputted to the first optical double side-band suppressed carrier modulator (2) and the second optical double side-band suppressed carrier modulator (3), and a delay of a modulating signal, which is applied to the two modulators (2, 3), is represented by the following equation:

$$(2n+1)/4f_m [\text{second}],$$

where n is integer, and fm [Hz] is frequency of the modulating signal applied to the two modulators (2, 3).

5. A radio signal generator (21) comprising:

a fourth harmonic generating system (22) including a fourth harmonic generating system, the fourth harmonic generating system being used as a modulating optical signal generator connectable to an optical source;

an optical detector (23) detecting an output light generated from the modulating optical signal generator; and an antenna (24) converting an optical signal to a radio signal, the optical signal being detected by the optical detector, wherein the radio signal generator generates the radio signal with a predetermined frequency by controlling a modulating frequency of the modulating signal, the modulating signal being applied to the two modulator (2,3), wherein the fourth harmonic generating system comprising:

a first optical double side-band suppressed carrier modulator (2);

a second optical double side-band suppressed carrier modulator (3), the second optical double side-band suppressed carrier modulator (3) being connected in series to the first optical double side-band suppressed carrier modulator (2);

a signal source (4) for generating a modulating signal, the modulating signal being applied to the first optical double side-band suppressed carrier modulator (2) and the second optical double side-band suppressed carrier modulator (3); and a signal controller (5) for controlling a modulating signal, the modulating signal being applied to the first optical double side-band suppressed carrier modulator (2) and the second optical double side-band suppressed carrier modulator (3) by the signal source (4), wherein "a lower side-band signal of the second optical double side-band suppressed carrier modulator (3) which is a modulated signal of an upper side-band signal of the first optical double side-band suppressed carrier modulator (2)" and "an upper side-band signal of the second optical double side-band suppressed carrier modulator (3) which is a modulated signal of a lower side-band signal of the first optical double side-band suppressed carrier modulator (2)" cancel each other, whereby a fourth harmonic signal is obtained.

6. A method for generating an optical signal using an optical modulating system, the system comprising:

a first optical double side-band suppressed carrier modulator (2);

a second optical double side-band suppressed carrier modulator (3), the second optical double side-band suppressed carrier modulator (3) being connected in series to the first optical double side-band suppressed carrier modulator (2);

a signal source (4) for generating a modulating signal, the modulating signal being applied to the first optical double side-band suppressed carrier modulator (2) and the second optical double side-band suppressed carrier modulator (3); and a signal controller (5) for controlling a modulating signal, the modulating signal being applied to the first optical double side-band suppressed carrier modulator (2) and the second optical double side-band suppressed carrier modulator (3) by the signal source (4), wherein "a lower side-band signal of the second optical double side-band suppressed carrier modulator (3) which is a modulated signal of an upper side-band signal of the first optical double side-band suppressed carrier modulator (2)" and "an upper side-band signal of the second optical double side-band suppressed carrier modulator (3) which is a modulated signal of a lower side-band signal of the first optical double side-band suppressed carrier modulator (2)" cancel each other, wherein each or the both of the first optical double side-band suppressed carrier modulator (2) and the second optical double side-band suppressed carrier modulator (3) are optical modulators comprise:

a first sub Mach-Zehnder waveguide;

a second sub Mach-Zehnder waveguide;

a main Mach-Zehnder waveguide containing the first sub Mach-Zehnder waveguide and the second sub Mach-Zehnder waveguide, and having an input part of light and an output part of modulated light;

a first sub Mach-Zehnder electrode for adjusting voltage applied to two arms of the first Mach-Zehnder waveguide;

a second sub Mach-Zehnder electrode for adjusting voltage applied to two arms of the second Mach-Zehnder waveguide; and a main Mach-Zehnder electrode for adjusting voltage applied to a Mach-Zehnder waveguide, wherein the method comprising the steps of:

(i) adjusting bias voltages of the main Mach-Zehnder electrode and the two sub Mach-Zehnder electrodes so that an output from the main Mach-Zehnder waveguide is augmented;

(ii) adjusting bias voltage of the main Mach-Zehnder electrode so that an output from the main Mach-Zehnder waveguide is reduced;

(iii) reducing bias voltage of one of the sub Mach-Zehnder electrodes so that an output from the main Mach-Zehnder waveguide is reduced; and (iv) adjusting bias voltages of the main Mach-Zehnder electrode so that an output from the main Mach-Zehnder waveguide is reduced.

7. A generating method of an optical signal as claimed in claim 6:

wherein the step of (i) adjusting bias voltages of the main Mach-Zehnder electrode and the two sub Mach-Zehnder electrodes so that an output from the main Mach-Zehnder waveguide is augmented is a step of adjusting bias voltages of the main Mach-Zehnder electrode and the two sub Mach-Zehnder electrodes so that an output from the main Mach-Zehnder waveguide is maximized;

wherein the step of (ii) adjusting bias voltage of the main Mach-Zehnder electrode so that an output from the main Mach-Zehnder waveguide is reduced is a step of adjusting bias voltage of the main Mach-Zehnder electrode so that an output from the main Mach-Zehnder waveguide is minimized;

wherein the step of (iii) reducing bias voltage of one of the sub Mach-Zehnder electrodes so that an output from the main Mach-Zehnder waveguide is reduced is a step of reducing bias voltage of one of the sub Mach-Zehnder electrodes so that an output from the main Mach-Zehnder waveguide is minimized;

wherein the step of (iv) adjusting bias voltages of the main Mach-Zehnder electrode so that an output from the main Mach-Zehnder waveguide is reduced is a step of adjusting bias voltage of the main Mach-Zehnder electrode so that an output from the main Mach-Zehnder waveguide is minimized.

* * * * *